FIG.1.

DIAGRAM SHOWING IONIC COMPOSITION OF THE UPPER AND LOWER LAYERS IN AN ORGANIC SOLVENT WATER SYSTEM

United States Patent Office 3,808,308
Patented Apr. 30, 1974

3,808,308
SOLVENT EXTRACTION PROCESS FOR SEPARATING IONIC COMPOUNDS
Leland J. Beckham, Pasco County, Fla., assignor to Allied Chemical Corporation, New York, N.Y.
Original application Nov. 17, 1967, Ser. No. 683,878, now Patent No. 3,635,661, dated Jan. 18, 1972. Divided and this application July 30, 1971, Ser. No. 167,862
Int. Cl. B01d *11/04;* C01b *9/02;* C01d *3/18*
U.S. Cl. 423—181                                    3 Claims

ABSTRACT OF THE DISCLOSURE

Metathesis reactions between water soluble ionic compounds are carried out by means of a liquid extraction process using water and a water miscible organic solvent. The separation of mixtures of water soluble salts are also carried out using water and a water miscible organic solvent.

---

This is a divisional application of my copending application Ser. No. 683,878, filed Nov. 17, 1967, now U.S. Pat. 3,635,661, patented Jan. 18, 1972.

BACKGROUND OF THE INVENTION

This invention concerns a new method for carrying out a metathesis reaction involving water-soluble ionic salts and it also concerns a new method for separating a mixture of water-soluble salts.

When two or more ionic compounds are dissolved in water, an equilibrium mixture of the ionic components usually results; and in order for a metathesis, or double decomposition reaction involving ionic compounds to proceed to completion in solution, one of the products must be removed from reaction in order to upset the equilibrium. Thus, a metathesis reaction between ionic compounds proceeds to completion in solution if one of the products precipitates from the solution due to its insolubility, escapes from the solution as a gas, or is nonionizable and thereby removed from the ionic equilibrium. However, it is difficult to carry out a metathesis reaction to completion in solution when both the starting materials and the products are water-soluble ionic compounds and in many cases no known method is available. In some instances, by working at two different temperatures and alternately crystallizing first one and then the other of the predominate salt pair, i.e. the two salts which crystallize out preferentially in a system containing four ionic species, it is possible to complete a metathesis reaction involving two water soluble salts in the direction of the predominant salt pair. This technique is illustrated, e.g., in the reaction:

$$NaNO_3 + KCl \rightarrow KNO_3 + NaCl$$

in "Aqueous Solution and the Phase Diagram" by Perdon and Slater (Arnold and Company, London, 1946), pp. 110–118. This method is applicable only for carrying out reactions in the direction of the predominate salt pair and only when there is a reasonable difference in relative solubility with temperature of the product salts.

SUMMARY OF THE INVENTION

An object of the present invention is to provide a new method for carrying out a metathesis reaction between ionic compounds. Another object of this invention is to provide a method whereby a metathesis reaction between water-soluble salts can be carried out substantially to completion in solution. Another object of the invention is the provision of a method by which a metathesis reaction between water-soluble components can be carried out in either direction; e.g., when a system has a predominate salt pair, the pair may be either reactants or products. A further object of this invention is the provision of a new process for preparing water-soluble alkali metal salts, including ammonium salts. A still further object of this invention is the provision of a simple and economical method for separating a mixture of water-soluble salts.

It has now been discovered that a metathesis reaction between two water-soluble salts can be carried out substantially to completion by means of a countercurrent liquid-liquid extraction involving water and a water miscible organic solvent. The present invention involves a method for carrying out a metathesis reaction according to the equation:

$$M_nX + nVY \rightarrow V_nX + nMY \qquad (I)$$

wherein M and V are different monovalent cations, X is a polyvalent anion, Y is a monovalent anion and $M_nX$, VY, $V_nX$ and MY are each water-soluble salts, and $n$ is an integer of 2 to 5 which comprises:

(a) Introducing $M_nX$ and water into a reaction zone;

(b) Introducing VY into said reaction zone at a point remote from the introduction of $M_nX$;

(c) Introducing a water-miscible organic solvent into said reaction zone at a point remote from the introduction of $M_nX$;

(d) Passing said $M_nX$ and water countercurrent to and into intimate contact with said VY and said organic solvent in said reaction zone, to effect a net flow of anion X opposite to the net flow of anion Y and to maintain a sufficient concentration of $M_nX$ and VY in the resultant mixture of water and organic solvent to cause formation of two liquid phases, a phase rich in said organic solvent and a phase rich in water, whereby anion Y is selectively extracted in the organic solvent-rich phase and anion X is selectively extracted in the water-rich phase;

(e) Withdrawing said organic solvent-rich phase containing MY from said reaction zone;

(f) Withdrawing said water-rich phase containing $V_nX$ from said reaction zone.

BRIEF DESCRIPTION OF THE DRAWINGS

In FIGS. 1 and 2, a single system has been diagrammed which contains the four indicated ionic species, water, and an organic solvent. In FIGS. 3 and 4, the effect of different organic solvents on the distribution of the indicated salt system is illustrated, each line representing the distribution of the ions in a different organic solvent-water mixture.

DESCRIPTION OF THE PREFERRED EMBODIMENTS

Organic solvents which are miscible with water and inert to the salts undergoing reaction are used in this process; preferred water miscible organic solvents include isopropyl alcohol, ethyl alcohol, acetone, β-ethoxyethanol, n-propyl alcohol, t-butyl alcohol, dioxane, methanol, dimethyl sulfoxide, piperidine, tertiary butylamine, dimethylformamide and mixtures of these solvents, Isopropyl alcohol is an especially preferred solvent in this process due to its solubility characteristics and low cost.

The cations M and V are monovalent ions such as sodium ($Na^+$), potassium ($K^+$), ammonium ($NH_4^+$) or lithium ($Li^+$). The anion Y is a monovalent water soluble anion, for example, fluoride ($F^-$), chloride ($Cl^-$), bromide ($Br^-$), iodide ($I^-$), nitrate ($NO_3^-$), monobasic phosphate ($H_2PO_4^-$), acetate ($CH_3COO^-$), formate ($HCOO^-$) or thiocyanate ($SCN^-$); and the anion X is a water-soluble polyvalent anion, i.e. an anion having a valency of two to five, such as dibasic phosphate ($HPO_4^=$), carbonate ($CO_3^=$), thiosulfate ($S_2O_3^=$), sulfate ($SO_4^=$), dibasic pyrophosphate ($H_2P_2O_7^=$), tribasic tripolyphosphate ($H_2P_3O_{10}^=$), dibasic citrate ($C_6H_6O_7^=$), tribasic citrate ($C_6H_5O_7^\equiv$), tetrabasic tetrapolyphosphate tribasic pyrophosphate ($HP_2O_7^\equiv$), tetrabasic tripolyphosphate and pentabasic tetrapolyphosphate

In carrying out a metathesis reaction according to this invention, the salts $M_nX$ and VY cause the mixture of water and water-miscible organic solvent to form two liquid phases; a phase which is predominantly water, designated herein as the water-rich phase, and a phase containing most of the water-miscible organic solvent (but not necessarily more solvent than water), designated herein as the organic solvent-rich phase. It has been found that under these conditions the polyvalent anion X is selectively extracted into the water-rich phase and the monovalent anion Y is selectively extracted into the organic solvent-rich phase. This process is carried out so that the organic solvent-rich phase flows countercurrent to the water-rich phase thus effecting a net flow of anion Y in a direction opposite to the net flow of anion X.

In accordance with this invention, to obtain the products $V_nX$ and MY, the starting material VY is introduced into the reaction zone at a point or points remote from the introduction of the starting material $M_nX$. Using a split feed, separation of the cations V and M is obtained by reason of the following. The anions X and Y are moving in opposite directions due to selective extraction in the two countercurrent liquid phases. The monovalent cations V and M have substantially no net motion since they generally have similar solubility characteristics in the two phases and, therefore, they show little or no relative distribution in the system. However, there is a definite gradient of cation distribution when the introduction of VY is remote from the introduction of $M_nY$, since the concentrations of M and V are then greatest at the respective points of introduction. Thus, the organic solvent-rich phase which contains the monovalent anion Y is fed at a point remote from the introduction of $M_nX$, and since the organic solvent-rich phase moves in a direction opposite to that of the water-rich phase, it is withdrawn at a point near the introduction of $M_nX$ where the concentration of the cation M is highest; the organic solvent-rich extract thereby contains the product MY. The water-rich phase containing the polyvalent anion X, moving in the opposite direction to that of the organic solvent-rich phase is then withdrawn near the point of introduction of the compound VY where the concentration of the cation V is greatest; the water-rich extract thereby contains the product $V_nX$. It is understood that each of the starting materials, i.e. $M_nX$, VY, water and organic solvents may be introduced from one or as many points in the system as is considered desirable, as long as the introduction of the reactant salts is at points remote from each other and the two resultant liquid phases move in a countercurrent direction to one another.

In the reaction zone some separation of the anions X and Y occurs, but the primary purpose of the reaction zone is to effect separation of the cations M and V. In order to further or complete the separation of X and Y, the solvent-rich extract containing the product MY may be passed into a polyvalent anion stripping zone wherein the organic solvent-rich phase is intimately contacted with a countercurent stream of a salt solution, preferably a reflux stream of the product MY after removal of all or part of the solvent. Likewise, the aqueous extract containing the product $V_nX$ may be passed into a monovalent anion stripping zone wherein the aqueous phase is intimately contacted with a countercurrent stream of the organic solvent or preferably of its mixture with water.

Alternatively, or in addition to the stripping zones, the product solvent streams can be further purified or concentrated by conventional crystallization procedures and by well-known distillation procedures.

The following equations exemplify reactions which can be carried out according to this process:

According to another aspect of the instant invention, a mixture of water-soluble salts is separated into salts containing monovalent anion and salts containing divalent or polyvalent anion by dissolving the salt mixture in a solvent composed of water and a water miscible organic solvent. Two liquid phases are thereby formed; a phase rich in water and a phase rich in organic liquid (but not necessarily more organic liquid than water), and the polyvalent anion is selectively extracted into the water-rich phase, while the monovalent anion is selectively extracted into the organic solvent-rich phase. By separation of the phases and repetition of the process, either as a batch or continuous countercurrent liquid-liquid extraction, substantially complete separation of the salt mixture into salts containing monovalent anion and salts containing divalent or polyvalent anions is obtained, substantially without separation of cations.

In a similar manner, if it is desired to carry out a partial metathesis reaction, without separation of the cations, as for example the preparation of ammonium-potassium hydrogen phosphate fertilizer from potassium chloride and diammonium phosphate, the starting materials are fed together into a mixture of water and water-miscible organic solvent and the products are obtained by separating the two liquid phases which form. Thus, if it is not important to separate the cations, the starting materials may be fed into a central stage of the countercurrent extraction.

The process of this invention can be carried out either as a batch or a continuous operation. Any apparatus suitable for countercurrent liquid-liquid extraction can be used including mixer-settler type equipment and continuous contact equipment, such as gravity-type columns, for example, spray towers, packed towers, and mechanically operated columns, such as pulsed columns and rotary-type columns, and centrifugal extractors such as Podbielniak extractors.

As in any extraction process, the degree of separation depends on the number of stages in the extraction and the strength of the separating force. The strength of the separating force varies greatly with the ionic components involved, and to some extent with the solvent system and the salt concentrations employed.

The strength of the separating force of a system is found by dissolving substantially equivalent proportions of the ionic components in a mixture of water and the chosen water-miscible organic solvent, separating the two phases thus formed, and determining the concentration of each ionic component in each phase. Several such determinations are illustrated in examples and the results of a few of these determinations are diagrammed in FIGS. 1–4, respectively.

Figure 1:
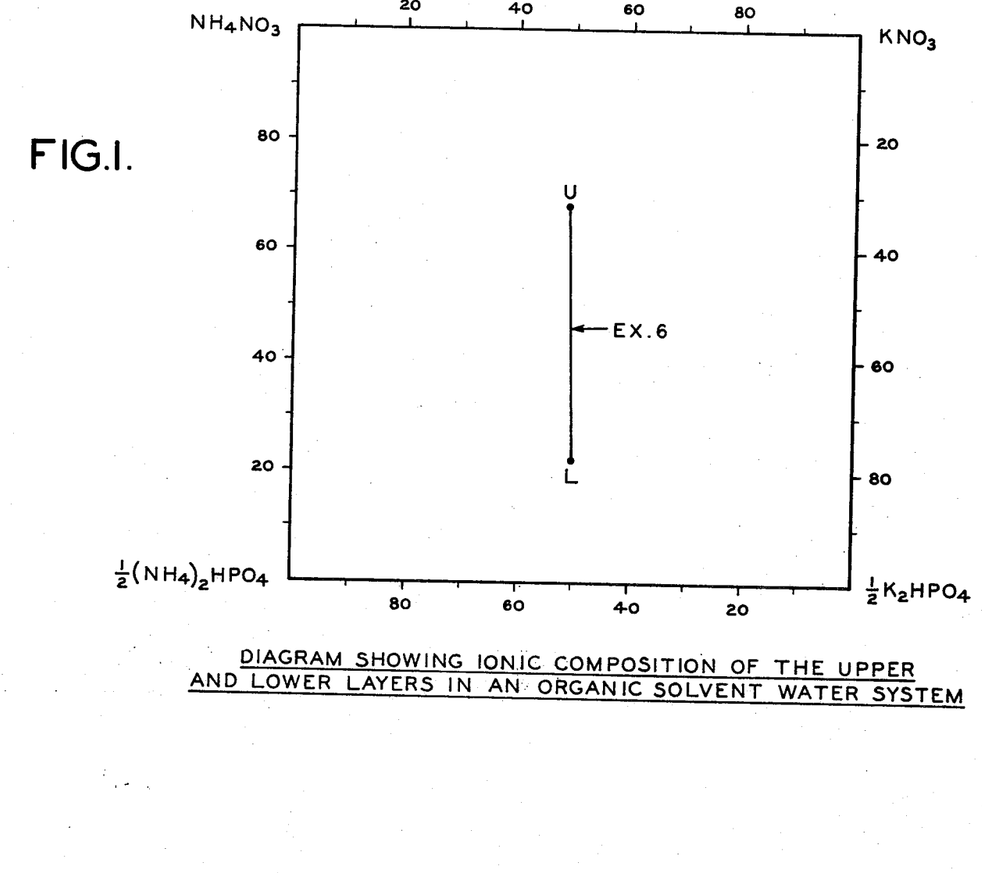
FIGS. 1–4 are diagrams which show the distribution of the indicated ionic components, expressed in equivalents, in each of the two phases of a system containing water, a water miscible organic solvent and the indicated salt mixture. As discussed in detail hereinafter, the upper point normally designates the ionic composition of the organic solvent-rich layer and the lower point the composition of the aqueous phase.
Figure 2:
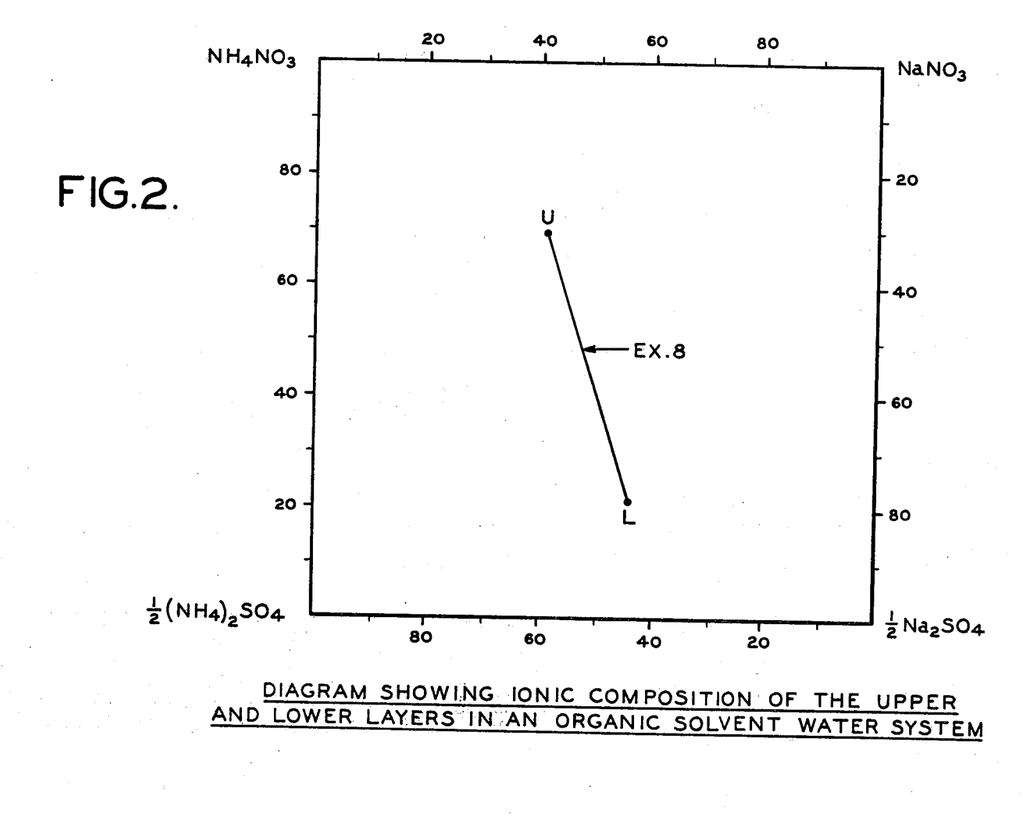
Figure 3:
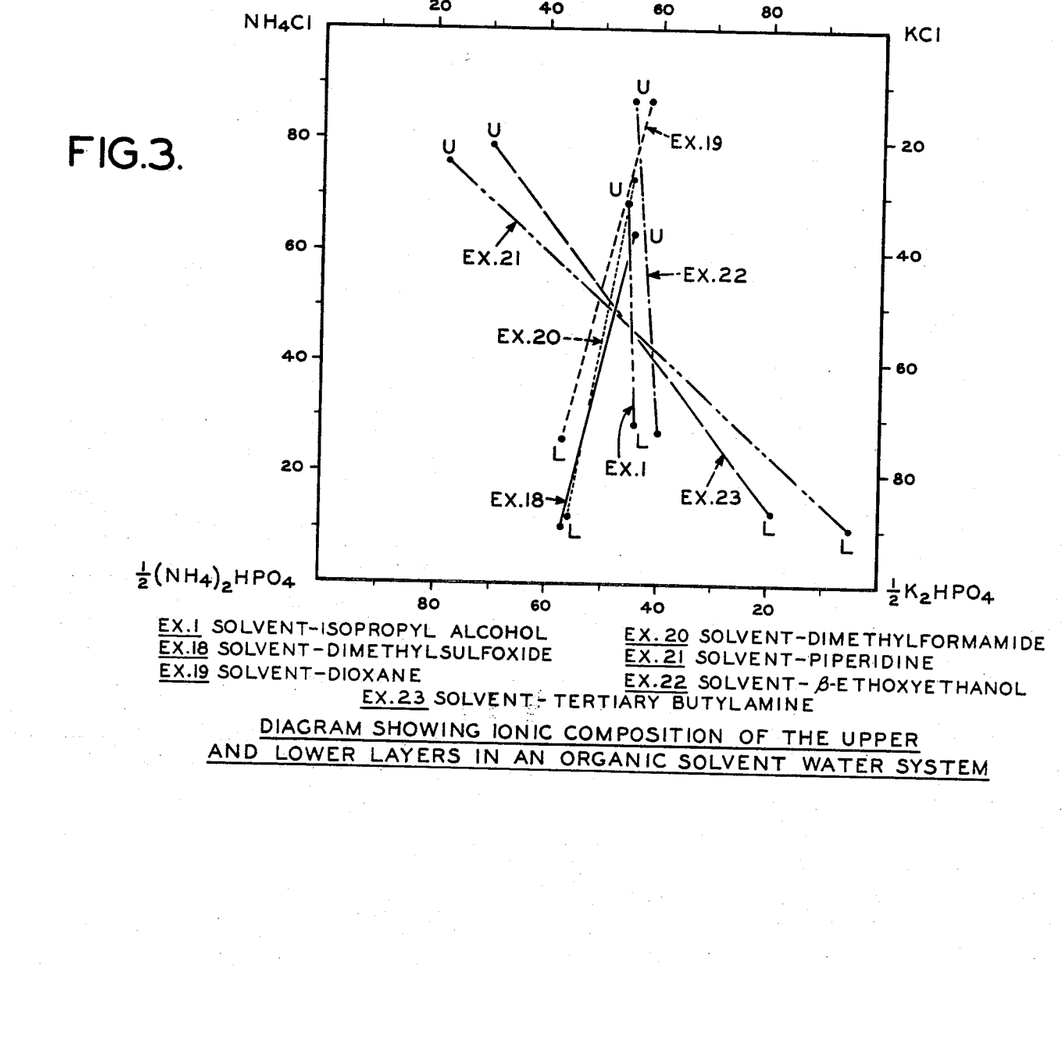
Figure 4:
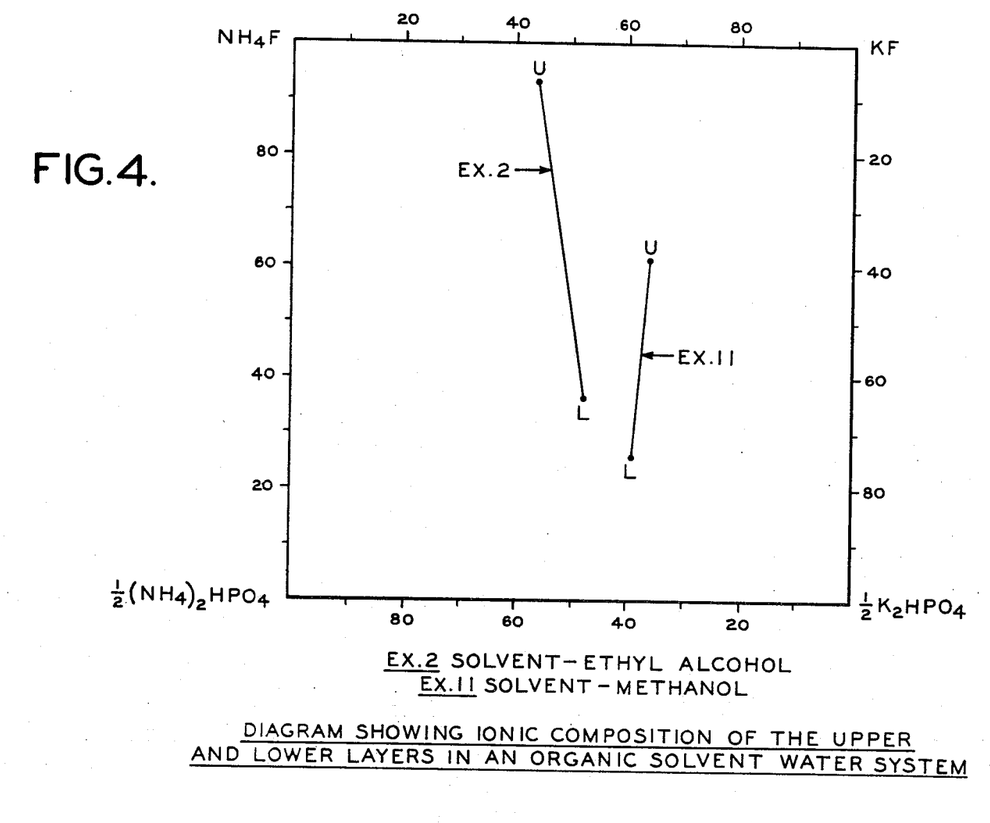

FIGS. 1–2 are diagrams which show the distribution of the indicated ionic components, expressed in equivalents, in each of the two phases of a system containing water, a water-miscible organic solvent, and the indicated salt mixture. If the four ionic components are mixed in equivalent amounts, this starting mixture would be represented by a point at the center of the diagram. The compositions, expressed in ion equivalents are plotted in what is generally described as a reciprocal salt pair diagram (Jänecke Projection, p. 439 and the reference to Table 17–1(g), p. 434, "The Phase Rule and Heterogeneous Equilibria" by John E. Ricci, D. Van Nostrand Co., Inc. (1951)). By convention, the starting salts are always designated at the upper right-hand corner and lower left-hand corner of the diagram. The upper point designates the ionic composition of the lighter, organic solvent-rich layer and the lower point the ionic composition of the heavy aqueous phase. By joining the points with a line as shown, and called hereinafter the distribution line, and observing its length and inclination, one obtains a good understanding of the system and can estimate the number of extraction stages required to obtain the degree of separation required, e.g., substantially complete metathesis if desired. Thus, the greater the vertical separation of the endpoints, the greater is the separation or distribution of the anions in a single-stage extraction. The inclination of the distribution line away from the vertical indicates the distribution of the cations; accordingly, an inclination toward the desired products indicates that fewer extraction stages are required whereas an inclination away from the desired products indicates that a greater number of extraction stages are required. However, unless the inclination is very great, approaching 45°, the reaction can be conducted in such way as to make either of the products.

Where the distribution of the ions in a particular solvent mixture is unfavorable for carrying out a metathesis reaction in the desired direction, a better distribution is often obtained by using a different organic solvent. The effect of using different solvents has been illustrated in FIGS. 3 and 4. In FIG. 3, the distribution of the ions $(K^+)$, $(Cl^-)$, $(NH_4^+)$, and $(HPO_4^=)$ in a variety of organic solvent-water mixtures has been plotted. The distribution lines show that the reaction can be carried out in either direction using any of the illustrated solvent systems in the process of this invention except piperidine and possibly tertiary butylamine. With those two solvents, the reaction can be carried out very readily in the direction of making $K_2HPO_4$. There is a substantial difference in the distribution of the ions in different systems and hence a difference in the ease of reaction, i.e., number of extraction stages required to carry out any particular metathesis reaction depending on the chosen organic solvent. As shown in FIG. 3, using an isopropyl alcohol-water mixture in the process of this invention, the reaction may be carried out to the right or the left with about equal ease; the slightly inclined distribution lines show that this is also true for a dimethylsulfoxide, dioxane, dimethyl-formamide, or β-ethoxyethanol-water mixture. However, this reaction is carried out more readily to the right using piperidine or tertiary butylamine-water mixture. The effect of two different organic solvent-water mixtures on the system $(K^+)$, $(F^-)$, $(NH_4^+)$, $(HPO_4^=)$ is illustrated in FIG. 4. It is seen from this diagram that using the present process, the reaction may be carried out in either direction and that it may be carried out to the right slightly more readily using a mixture of water and ethanol and slightly more readily to the left using a methanol-water mixture.

While it has not been possible to determine rigorously the exact number of stages required to carry out a particular reaction to a specified extent, due to the fact that at each extraction stage both the concentration of the four ionic species and the proportions of organic solvent and water change in the two phases, it is possible to treat mathematically the analytical data obtained and to derive an index showing relative separating strength of the system. In the system $$M_2X + 2VY \rightleftharpoons V_2X + 2MY$$

the index for making $V_2X$ and $MY$ is expressed as $$\frac{C_m^u C_y^u}{C_m^l C_y^l} \cdot \frac{C_v^l C_x^l}{C_v^u C_x^u}$$

and the index for making $M_2X$ and $VY$ is expressed as $$\frac{C_v^u C_y^u}{C_v^l C_y^l} \cdot \frac{C_m^l C_x^l}{C_m^u C_x^u}$$

wherein $C_m$, $C_x$, $C_v$, $C_y$ represent the ionic concentrations in milliequivalents per 100 grams of layer with the superscripts $u$ and $l$ indicating upper and lower layers, respectively. An index of one is the limiting case where no separation occurs; the larger the index the better the separation and the fewer the number of extraction stages required for any desired degree of reaction.

In the event the index for a single-stage extraction of a system is close to one, the system usually can be improved by changing the salt concentration, the proportion of organic solvent and water in the system and/or as already discussed, the organic solvent.

However, it has been found in general that the strength of the separating force of water, water-miscible organic solvent systems containing monovalent metallic cations, including ammonium ion, a polyvalent anion and a monovalent anion is sufficiently high to effect a good degree of separation of the desired products if at least three extraction stages are used. In some cases, however, if substantially complete separation is desired, it may be necessary to use thirty or forty extraction stages. To effect a substantially complete metathesis reaction of the type described herein with reasonable economy, of the order of 5 to 25 extraction stages are generally preferred; by extraction stages it is understood that the stages may be actual or theoretical stages.

Figure 5:
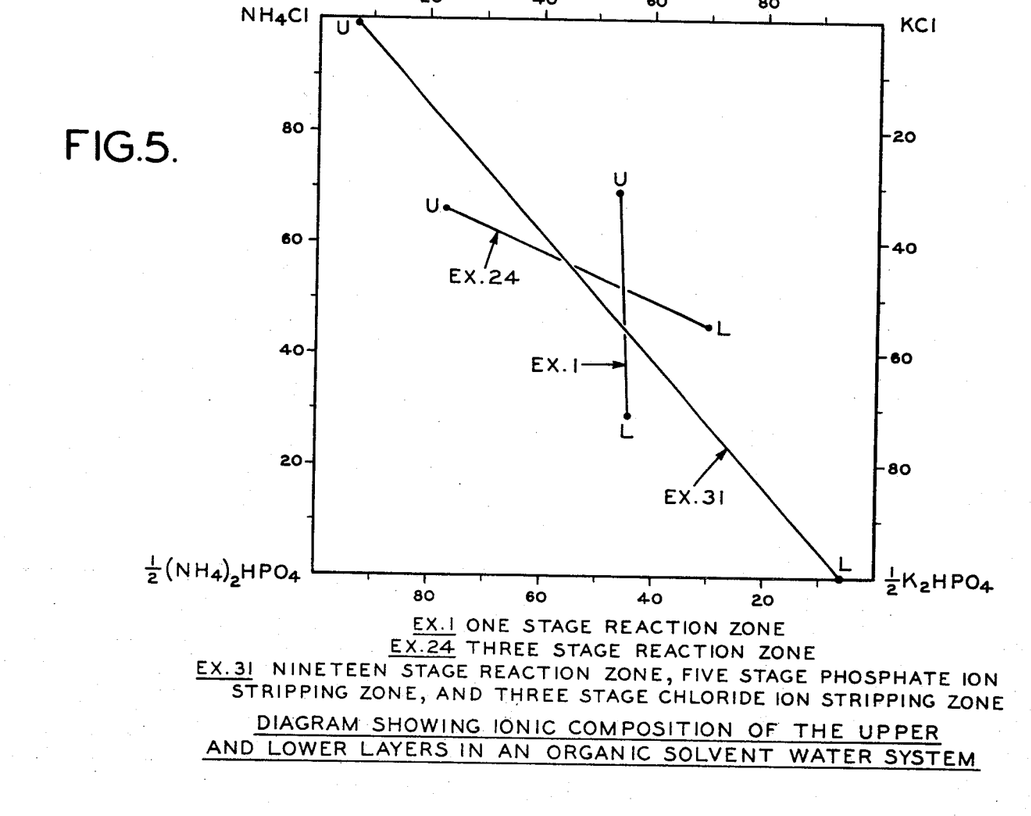
FIGS. 5 and 6 are each diagrams which show the distribution of ionic components, in equivalents, obtained in each of the product streams by carrying out the indicated metathesis reaction in accordance with this invention, but using different numbers of extraction stages, in FIG. 5, the use of stripping zones, is illustrated.
Figure 6:
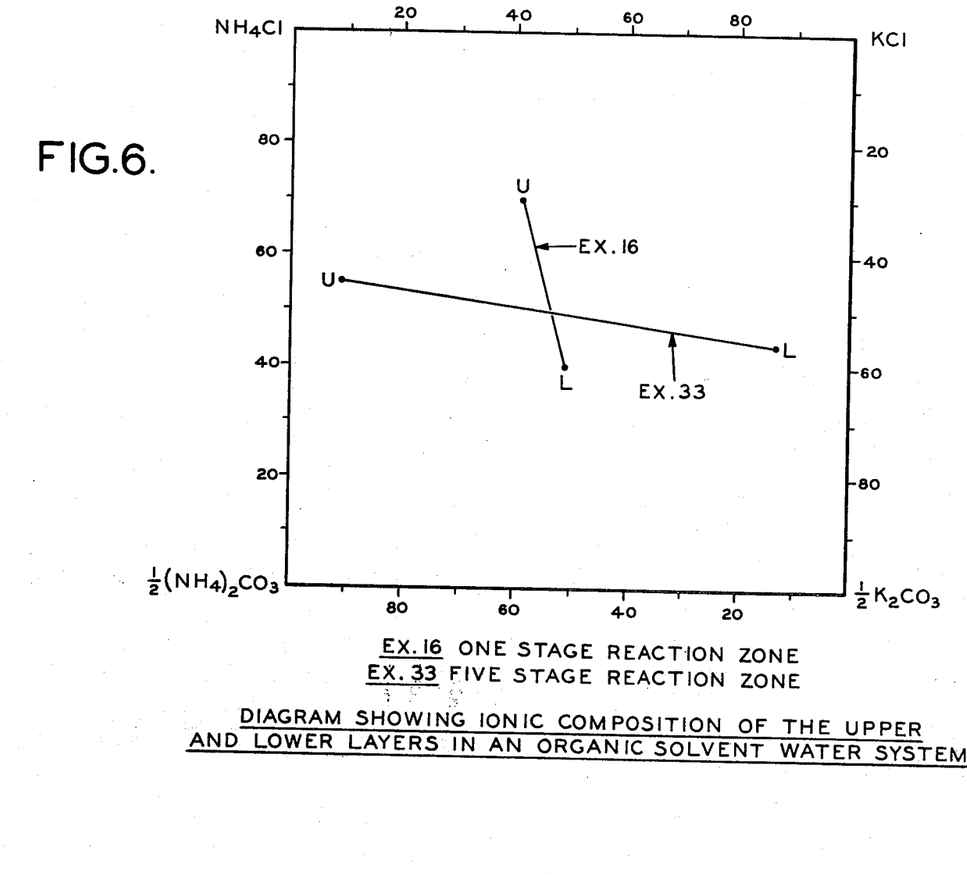

The reaction of potassium chloride and diammonium phosphate in a mixture of water and isopropyl alcohol, for example, is substantially complete when a 19-stage reaction zone is used in combination with chloride and phosphate stripping zones. In FIG. 5 the degree of reaction of potassium chloride and diammonium phosphate, in a water isopropyl alcohol mixture using reaction zones with different numbers of stages and with and without stripping zones is compared. It is found that the reaction is proceeding in the desired direction, but is incomplete when a 3-stage reaction zone is used, and that substantially complete separation of the cations and anions is obtained using a 19-stage reaction zone together with stripping zones. In FIG. 6, the use of a 1 and 5 stage reaction section respectively to effect the reaction of potassium chloride and diammonium carbonate using water and isopropyl alcohol has been diagrammed. It is seen that the separation of the potassium and the chloride ions is nearly complete using a 5-stage reaction section.

The process of the invention is conveniently carried out at ambient temperatures although higher or lower temperatures can be used. In some industrial applications, somewhat elevated temperatures may be preferred.

In order to effect separation of the mixture of water and water-miscible organic solvent at ambient temperature, the salt concentration must ordinarily be at least 1 part by weight per 100 parts by weight of solvent mixture, and the salt concentration can range up to the saturation point. The effectiveness of a system changes somewhat at different concentrations, and for any given system, a particular range of concentration is most advantageous; however, for reasons of economy, it is usually preferable to work with relatively concentrated solutions. Therefore, it is preferable to carry out the process wherein the salt concentration in the reaction zone is at least 5 parts by weight per 100 parts by weight of the solvent mixture.

The most favorable proportion of the organic solvent in the reaction zone also depends on the particular system undergoing metathesis; about 25 to 400 parts by weight of organic solvent per 100 parts by weight of water can be used in this process; however, the preferred proportion of organic solvent is on the order of 30 parts to 200 parts by weight of organic solvent per 100 parts by weight of water. The parts of solvent for 100 parts of water preferably should exceed that at the plait point, i.e., the composition at which the two conjugate layers of the system become identical.

The salt, in a few instances, does not effect a separation of the solvent mixture into two phases. This happens either because the salt is present in insufficient concentration, which occurs particularly in the polyvalent anion stripping zone of the extraction, or because of its poor salting out characteristic. In any case, the lack of two phases in a system may be corrected by the addition of a minor amount of a water-immiscible solvent, usually a liquid hydrocarbon or even by the addition of another salt such as, e.g., NaCl. Since the system is normally close to separation into two phases due to the presence of the salt mixture, only a minor amount of hydrocarbon, of the order of 0.1 to 5 percent by weight of the solvent mixture, usually needs to be introduced into the reaction zone, though occasionally somewhat larger amounts up to about 10 or 20 percent by weight of the solvent mixture may be added to a stripping zone.

In one manner of carrying out the process of this invention in a reaction zone containing $n$ number of extraction stages, water and the polyvalent anion-containing salt are fed at stage 1 of the reaction zone. The salt can be introduced in any manner which is convenient; a common method is to premix the salt with water and to introduce it into the reaction zone at the desired concentration. If the process includes a polyvalent anion stripping zone, the water-rich phase from the stripper, containing the polyvalent anion salt and minor quantities of monovalent anion salt from the water-miscible organic solvent is returned to the reaction zone at stage 1. The monovalent-anion salt is fed into the reaction zone at stage $n$, and the water-miscible organic solvent is also introduced at stage $n$. The monovalent-anion salt is also introduced in any convenient manner, for example, in granular form, as a slurry, or in solution. In most instances it has been found necessary to introduce water at stage $n$ in addition to the organic solvent in order to obtain the proper salt distribution in the layers; and sometimes, a minor amount of the water-miscible organic solvent is introduced at stage 1 of the reaction zone. Maintenance of liquid-liquid countercurrent extractions at a steady state, i.e., wherein the rate of withdrawal of the solvents from the extraction is approximately the same as the rate of introduction, is usually desirable. In addition, if the aim is to isolate two substantially pure products from the metathesis reaction, an excess of one reactant is to be avoided, and it is also desirable to run the extraction process balanced with respect to the net flow of polyvalent anion and monovalent anion. Surprisingly, it has been found in practice, that in order to maintain most extraction systems of this invention in balance with respect to the net flow of the solvents and with respect to the net flow of the anions, while the water-rich phase flows countercurrent to the organic solvent-rich phase, usually the net flow of both water and organic solvent is from stage $n$ to stage 1. Thus, it is found that while the exact proportion of water and organic solvent in each phase varies at each stage, in general, the heavy, water-rich phase contains only a minor quantity of organic solvent, whereas the light, organic solvent-rich phase contains, in addition to most of the organic solvents, substantial quantities of water, in some instances even exceeding the quantity of organic solvent. If the system is operated with a monovalent anion stripping zone, water and the water-miscible organic solvent may be added to a stage in the monovalent anion stripping zone. The organic solvent-rich phase from the stripping zone which is then introduced at stage $n$ of the reaction zone contains water, monovalent anion and a lesser quantity of polyvalent anion.

Generally, the monovalent-anion containing salt and the polyvalent anion containing salt are introduced into the reaction zone in approximately equivalent proportions, the rate being such as to provide a salt concentration of at least 1 part and preferably about 5 to 15 parts per 100 parts of total solvent in the reaction zone. However, in certain processes where only one product is of interest, the proportions of reactants may be varied.

According to this invention, a metathesis reaction can also be made to take place between two water-soluble ionic compounds where there is little or no separation or distribution of the cation or anion pair in the two liquid phases. Such metathesis reaction may be carried out according to this invention by adding other salts to the system which, in a sense, are equivalent to a catalyst. Thus, a reaction wherein all the ions are monovalent which may be represented by the equation:

$$VY + MZ \rightarrow VZ + MY$$

wherein V and M are different monovalent cations, Y and Z are different monovalent anions, VZ, MZ and MY are water-soluble salts, is successfully carried out by adding $M_nX$ to the system, wherein $M_nX$ is a water-soluble salt, M is a monovalent cation, and X is a divalent or polyvalent anion. In accordance with this invention, the reaction represented by Equation I below is carried out, and then the reaction represented by Equation II is carried out with the overall results indicated in Equation III.

$$M_nX + nVY \rightarrow V_nX + nMY \quad (I)$$

$$V_nX + nMZ \rightarrow M_nX + nVZ \quad (II)$$

$$nVY + nMZ \rightarrow nMY + nVZ \quad (III)$$

Furthermore, the two reactions can be run consecutively in two countercurrent extraction systems, or they can be carried out together in different zones of the same system. In the latter case, $M_nX$ and $V_nX$ are continuously withdrawn from different points and reintroduced at the proper stages of their respective reaction zones and, thus, effectively never leave the system.

The following examples describe specific embodiments of my invention and illustrate the best method contemplated for carrying it out, but they are not to be interpreted as limiting the invention to all details thereof, since changes can be made without departing from the scope or spirit of the invention. Parts and percentages are by weight and temperatures are in degrees centigrade.

The first 23 examples demonstrate the feasibility of operating the process of the invention with the particular salts and solvents systems. These examples are important as indicating the effect of a single extraction stage and permit a judgement on the number of stages required to extend this separation, i.e., effect a complete metathesis reaction or to effect the degree of separation desired. In each of these 23 examples, an index (I) indicating the separating strength as previously discussed, is determined for reaction in either direction.

THE SEPARATION OF SALT MIXTURES

Example 1

Diammonium phosphate, 4.5 grams, and potassium chloride, 5.5 grams, were dissolved in 60 grams of water, and 30 grams of isopropyl alcohol were added. After shaking, the mixture was allowed to separate into two liquid layers. The upper phase weighed 79.7 grams; the lower phase weighed 18.8 grams. Analysis of the phases gave the following results.

| | Analysis: Milliequivalents per 100 grams of layer | | | |
|---|---|---|---|---|
| | $C_m(NH_4^+)$ | $C_y(F^-)$ | $C_v(K^+)$ | $C_x(HPO_4^-)$ |
| Upper layer | 46.7 | 70.0 | 54.7 | 31.4 |
| Lower layer | 137.6 | 89.7 | 174 | 222.2 |

The composition of the two layers has been diagrammed graphically in FIG. 3.

Derivation of index number $$M_2X + 2VY \longrightarrow V_2X + 2MY$$
$$(NH_4)_2HPO_4 \; 2KCl \quad K_2HPO_4 \; 2NH_4Cl$$

$$I = \frac{46.7 \times 70.0 \times 174 \times 222.2}{137.6 \times 89.7 \times 54.7 \times 31.4} = 5.9$$

$$V_2X + 2MY \longrightarrow M_2X + 2VY$$
$$K_2HPO_4 \; 2NH_4Cl \quad (NH_4)_2HPO_4 \; 2KCl$$

$$I = \frac{70.0 \times 54.7 \times 137.6 \times 222.2}{89.7 \times 174 \times 46.7 \times 31.4} = 5.1$$

| Equivalent ratio | | Upper layer | Lower layer |
|---|---|---|---|
| Cations | $NH_4^+/K^+$ | 46/54 | 44/56 |
| Anions | $Cl^-/HPO_4^-$ | 69/31 | 29/71 |

Example 2

Potassium fluoride, 13.1 grams, and diammonium phosphate, 14.9 grams, were dissolved in 100 grams of water, and 100 grams of ethyl alcohol were added. After shaking, the mixture was allowed to separate into two liquid layers. The upper phase weighed 166.9 grams; the lower phase weighed 58.3 grams. Analysis of the phases gave the following results.

| | Analysis: Milliequivalents per 100 grams of layer | | | |
|---|---|---|---|---|
| | $C_m(NH_4^+)$ | $C_y(F^-)$ | $C_v(K^+)$ | $C_x(HPO_4^-)$ |
| Upper layer | 35.5 | 59.7 | 28.2 | 4.0 |
| Lower layer | 275 | 208 | 298 | 365 |

Derivation of index number $$M_2X + 2VY \longrightarrow V_2X + 2MY$$
$$(NH_4)_2HPO_4 \; 2KF \quad K_2HPO_4 \; 2NH_4F$$

$$I = \frac{35.5 \times 59.7 \times 298 \times 365}{275 \times 208 \times 28.2 \times 4.0} = 36$$

$$V_2X + 2MY \rightarrow M_2X + 2VY$$
$$K_2HPO_4 \; 2NH_4F \quad (NH_4)_2HPO_4 \; 2KF$$

$$I = \frac{28.2 \times 59.7 \times 275 \times 365}{298 \times 208 \times 35.5 \times 4.0} = 19$$

| Equivalent ratio | | Upper layer | Lower layer |
|---|---|---|---|
| Cations | $K^+/NH_4^+$ | 44/56 | 52/48 |
| Anions | $F^-/HPO_4^-$ | 93/7 | 36/64 |

Example 3

Potassium chloride, 16.8 grams, and ammonium formate, 14.2 grams, were dissolved in 100 grams of water, and 100 grams of isopropyl alcohol were added. After shaking, the mixture was allowed to separate into two liquid layers. The upper phase weighed 134.7 grams; the lower phase weighed 95.3 grams. Analysis of the phases gave the following results.

| | Analysis: Milliequivalents per 100 grams of layer | | | |
|---|---|---|---|---|
| | $C_m(NH_4^+)$ | $C_y(F^-)$ | $C_v(K^+)$ | $C_x(HCO^-)$ |
| Upper layer | 55.6 | 41.1 | 37.4 | 51.9 |
| Lower layer | 149.0 | 171.2 | 183.8 | 161.6 |

$$MX + VY \rightarrow VX + MY$$
$$NH_4OOCH \; KCl \quad KOOCH \; NH_4Cl$$

$$I = \frac{55.6 \times 41.1 \times 183.8 \times 161.6}{149 \times 171.2 \times 37.4 \times 51.9} = 1.4$$

$$MX + VY \leftarrow VX + MY$$
$$NH_4OOCH \; KCl \quad KOOCH \; NH_4Cl$$

$$I = \frac{37.4 \times 41.1 \times 149 \times 161.6}{183.8 \times 171.2 \times 55.6 \times 51.9} = 0.41$$

| Equivalent ratio | | Upper layer | Lower layer |
|---|---|---|---|
| Cations | $K^+/NH_4^+$ | 40/60 | 55/45 |
| Anions | $Cl^-/HCOO^-$ | 44/56 | 51/49 |

This test shows that the two monovalent anions have little or no tendency to separate from each other in the two liquid layers.

Examples 4-23 have been carried out in the same manner as Examples 1 and 2; the starting materials and the results have been tabulated in Table I.

3,808,308

TABLE 1

| Ex. No. | Starting materials | | | | Analysis of product | | | | | | | | | | |
|---|---|---|---|---|---|---|---|---|---|---|---|---|---|---|---|
| | Amount (g.) M₂X | Amount (g.) Y | Amt. (g.) water | Amount organic solvent | Layer | Total weight (g.) of each layer | Milliequivalents of each ion, per 100 g. of layer | | | | Equivalent ratio | | | Index (I) of reaction | |
| | | | | | | | C_m | C_y | C_v | C_x | Cations | Anions | | ← | → |
| 4 | 6.6, (NH₄)₂HPO₄ | 16.6, KI | 100 | 53.6 g., t-Butyl alcohol | Upper | 141.7 | 41.3 (I⁻) | 57.6 (K⁺) | 43 (HPO₄⁻) | 26.7 | 51/49 K⁺/NH₄⁺ | 51/49 I⁻/HPO₄⁻ | 68/32 | 6.3 | 6.3 |
| | | | | | Lower | 32.5 | 108 | 56.4 | 113 | 164.6 | 51/49 | | 25/75 | | |
| 5 | 8.25, (NH₄)₂HPO₄ | 14.9, KBr | 200 | 200 g., t-Butyl alcohol | Upper | 331.3 | 13.3 (Br⁻) | 22.6 (K⁺) | 15.4 (HPO₄⁻) | 6.1 | 54/46 K⁺/NH₄⁺ | 54/46 Br⁺/HPO₄⁻ | 79/21 | 8.1 | 8.0 |
| | | | | | Lower | 82.1 | 86 | 58.2 | 99 | 126.8 | 54/46 | | 31/69 | | |
| 6(c) | 11.9, (NH₄)₂HPO₄ | 18.1, KNO₃ | 140 | 70 g., Isopropyl alcohol | Upper | 199.6 | 53.2 (NO₃⁻) | 72.0 (K⁺) | 56.5 (HPO₄⁻) | 34.1 | 51/49 K⁺/NH₄⁺ | 51/49 NO₃⁻/HPO₄⁻ | 68/32 | 8.0 | 7.3 |
| | | | | | Lower | 39.6 | 176.3 | 75.6 | 179.0 | 272.8 | 50/50 | | 22/78 | | |
| 7 | 7, Citric acid hydrate plus 5.6, KOH | 5.35, NH₄Cl | 50 | 75 g., Isopropyl alcohol | Upper | 108.4 | 17 (Cl⁻) | 36 (NH₄⁺) | 22 (Citr.⁻) | 3 | 56/44 NH₄⁺/K⁺ | 48/52 Cl⁻/Citr≡ | 92/8 | 26 | 13 |
| | | | | | Lower | 35.2 | 205 | 154 | 186 | 237 | | | 39/61 | | |
| 8d | 16.5, (NH₄)₂SO₄ | 21.25, NaNO₃ | 100 | 40 g., acetone | Upper | 135.2 | 117.9 (NO₃⁻) | 136.6 (Na⁺) | 80.7 (SO₄⁻) | 62 | 41:59 Na⁺/NH₄⁺ | 56/44 NO₃⁻/SO₄⁻ | 69/31 | 4.5 | 15.4 |
| | | | | | Lower | 38.1 | 212.5 | 100.7 | 269.2 | 381 | 56/44 | | 21/79 | | |
| 9 | 15, (NH₄)₂SO₄ | 30, LiBr | 125 | 77 g., Isopropyl alcohol | Upper | 201 | 70 (Br⁻) | 121 (Li⁺) | 108.9 (SO₄⁻) | 57.9 | 61/39 Li⁺/NH₄⁺ | 61/39 Br⁻/SO₄⁻ | 68/32 | 4.8 | 3.0 |
| | | | | | Lower | 45.4 | 164 | 127 | 199 | 236 | 55/45 | | 35/65 | | |
| 10 | 15.8, K₂SO₄ | 17.4, LiBr | 100 | 150 g., n-propyl alcohol | Upper | 203.2 | 25 (Br⁻) | 36 (Li⁺) | 12 (SO₄⁻) | 1 | 32/68 Li⁺/K⁺ | 38/62 Br⁻/SO₄⁻ | 97/3 | 51 | 82 |
| | | | | | Lower | 78.5 | 227 | 131 | 139 | 235 | | | 36/64 | | |
| 11ᵉ | 66, (NH₄)₂HPO₄ | 11.6, KF | 45 | 40 cc., methanol | Upper(e) | — | 103 (F⁻) | 203 (K⁺) | 182 (HPO₄⁻) | 82 | 64/36 K⁺/NH₄⁺ | 61/39 F⁻/HPO₄⁻ | 61/39 | 8.0 | 6.4 |
| | | | | | Lower | — | 249 | 165 | 392 | 476 | | | 26/74 | | |
| 12ᵃ | 17.4, K₂HPO₄ | 20.6, NaBr | 110 | 120 g., methanol | Upper(e) | 132.2 | 78 (Br⁻) | 103 (Na⁺) | 40 (HPO₄⁻) | 15 | 34/66 Na⁺/K⁺ | 42/58 Br⁻/HPO₄⁻ | 87/13 | 150 | 290 |
| | | | | | Lower | 39.9 | 366 | 20 | 262 | 608 | | | 3/97 | | |
| 13 | 17.4, K₂HPO₄ | 16.2, NaSCN | 100 | 40 g., n-propyl alcohol | Upper | 218 | 100 (SCN⁻) | 126 (Na⁺) | 71 (HPO₄⁻) | 45 | 42/58 Na⁺/K⁺ | 54/46 SCN⁻/HPO₄⁻ | 74/26 | 7.3 | 20.7 |
| | | | | | Lower | 72.9 | 177 | 72 | 211 | 316 | | | 19/81 | | |
| 14 | 17.4, K₂HPO₄ | 15.4, NH₄Ac | 100 | 161 g., n-propyl alcohol | Upper | 132.2 | 24 (CH₃COO⁻) | 47 (NH₄⁺) | 24 (HPO₄⁻) | 1 | 50/50 NH₄⁺/K⁺ | 48/52 CH₃COO⁻/HPO₄ | 98/2 | 95 | 79 |
| | | | | | Lower | 72.9 | 205 | 138 | 187 | 254 | | | 35/65 | | |
| 15 | 10.5, citric acid hydrate plus 5.6, KOH | 5.35, NH₄Cl | 50 | 75 g., Isopropyl alcohol | Upper | 110.5 | 19 (Cl⁻) | 40 (NH₄⁺) | 32 (H Citr.⁻) | 11 | 63/37 NH₄⁺/K⁺ | 48/52 C⁻/H Citr.⁻ | 78/22 | 9.8 | 2.9 |
| | | | | | Lower | 36.6 | 184 | 143 | 167 | 208 | | | 41/59 | | |
| 16ᵇ | 6.0, (NH₄)₂CO₃ | 9.39, KCL | 50 | 75 g., Isopropyl alcohol | Upper | 90 | 32.4 (Cl⁻) | 38.6 (K⁺) | 22.8 (CO₃⁻) | 16.6 | 41/59 K⁺/NH₄⁺ | 49/51 Cl⁻/CO₃⁻ | 70/30 | 2.6 | 4.7 |
| | | | | | Lower | 50.2 | 231.1 | 181.3 | 220.2 | 271 | | | 40/60 | | |
| 17 | 6.88, (NH₄)₂S₂O₃ | 6.9, KCL | 73.4 | 42.1 g., Isopropyl alcohol | Upper | 80.6 | 40.5 (Cl⁻) | 47 (K⁺) | 45 (S₂O₃⁻) | 38.5 | 53/47 K⁺/NH₄⁺ | 60/40 Cl⁻/S₂O₃⁻ | 55/45 | 1.8 | 3.2 |
| | | | | | Lower | 48.0 | 82.8 | 68.8 | 122 | 136 | | | 34/64 | | |
| 18ᵉ | 6.6, (NH₄)₂KPO₄ | 7.4, KCl | 48 | 20 g., dimethyl sulfoxide | Upper | 72 | 91 (Cl⁻) | 128 (K⁺) | 111 (HPO₄⁻) | 74 | 55/45 K⁺/NH₄⁺ | 43/57 Cl⁻/HPO₄ | 63/37 | 24.6 | 9.4 |
| | | | | | Lower | 9 | 340 | 61 | 257 | 536 | | | 10/90 | | |
| 19 | 6.6, (NH₄)₂HPO₄ | 7.4, KCl | 32 | 20 g., dioxane | Upper | 44.8 | 69 (Cl⁻) | 143 (K⁺) | 95 (HPO₄⁻) | 21 | 58/42 K⁺/NH₄ | 43/57 Cl⁻/HPO₄⁻ | 87/13 | 36 | 11 |
| | | | | | Lower | 21.1 | 349 | 158 | 261 | 452 | | | 26/74 | | |

See footnotes at end of table.

TABLE I—Continued

| Ex. No. | Starting materials | | | | Layer | Total weight (g.) of each layer | Analysis of product — Milliequivalents of each ion, per 100 g. of layer | | | | Equivalent ratio | | Index (I) of reaction |
|---|---|---|---|---|---|---|---|---|---|---|---|---|---|
| | Amount (g.) M:X | Amount (g.) Y:Y | Amt. (g.) water | Amount organic solvent | | | $C_m$ | $C_y$ | $C_x$ | $C_z$ | Cations | Anions | |
| 20 a | 6.6, $(NH_4)_2HPO_4$ | 7.4, KCl | 48 | 20 g., dimethyl-formamide | Upper | 69.5 | 76 ($NH_4^+$) | 128 ($K^+$) | 100 ($HPO_4^=$) | 48 ($Cl^-$) | $K^+/NH_4^+$ 57/43 | $Cl^-/HPO_4^=$ 73/27 | } 34 |
| | | | | | Lower | 12.5 | 327 ($NH_4^+$) | 69 ($K^+$) | 264 ($HPO_4^=$) | 512 ($Cl^-$) | 44/56 | 12/88 | 12 |
| 21 c | 6.6, $(NH_4)_2HPO_4$ | 7.4, KCl | 32 | 40 g., piperidine | Upper | 71.5 | 129 ($NH_4^+$) | 126 ($K^+$) | 36 ($HPO_4^=$) | 39 ($Cl^-$) | $K^+/NH_4^+$ 22/78 | $Cl^-/HPO_4^=$ 76/42 | } 45 |
| | | | | | Lower | 14.5 | 28 ($NH_4^+$) | 53 ($K^+$) | 525 ($HPO_4^=$) | 500 ($Cl^-$) | 95/5 | 10/90 | 2,058 |
| 22 d | 6.6, $(NH_4)_2HPO_4$ | 7.4, KCl | 32 | 20 g., β-ethoxy-ethanol | Upper | 46.5 | 81 ($NH_4^+$) | 150 ($K^+$) | 100 ($HPO_4^=$) | 31 ($Cl^-$) | $K^+/NH_4^+$ 55/45 | $Cl^-/HPO_4^=$ 83/17 | } 11 |
| | | | | | Lower | 19.0 | 217 ($NH_4^+$) | 148 ($K^+$) | 323 ($HPO_4^=$) | 392 ($Cl^-$) | 60/40 | 27/73 | 15 |
| 23 e | 6.6, $(NH_4)_2HPO_4$ | 7.4, KCl | 32 | 20 g., t-butyl-amine | Upper | 48.2 | 157 ($NH_4^+$) | 177 ($K^+$) | 66 ($HPO_4^=$) | 46 ($Cl^-$) | $K^+/NH_4^+$ 30/70 | $Cl^-/HPO_4^=$ 79/21 | } 2.5 |
| | | | | | Lower | 18.0 | 99 ($NH_4^+$) | 68 ($K^+$) | 434 ($HPO_4^=$) | 465 ($Cl^-$) | 81/19 | 13/87 | 274 | a Solids separated; only liquid phases were analyzed.
b 10% aqueous ammonia used instead of water.
c Product layers diagrammed in Fig. 1.
d Product layers diagrammed in Fig. 2.
e Product layers diagrammed in Fig. 3.
f Product layers diagrammed in Fig. 4.
g Product layers diagrammed in Fig. 6.

METATHESIS REACTIONS

The following examples of this process have been carried out as batch simulations of continuous countercurrent liquid-liquid extractions in order to study the process in detail. The procedures used, except in Example 31, have been based on the description of batch simulations of countercurrent extractions in chapter 9 of Liquid Extraction by Robert E. Treyball, 2nd ed., McGraw-Hill Book Company, New York; however, the procedures therein have been modified in order to fit this particular process. Example 31 follows, in part, a new batch simulation technique, which is described in detail therein.

Example 24

$$2KCl + (NH_4)_2HPO_4 \rightarrow K_2HPO_4 + 2NH_4Cl$$

A three-stage reactor was simulated using three separatory funnels identified hereinafter as Nos. 1, 2 and 3. The reaction was conducted at an ambient temperature of 25° C. About 14.9 grams $(NH_4)_2HPO_4$ and 16.8 grams KCl were dissolved in 200 grams of water and 100 grams isopropyl alcohol in funnel No. 2 for startup and shaken to reach equilibrium.

To initiate the first cycle, the layers were separated, the lighter layer being transferred to funnel No. 1 and the heavier layer to funnel No. 3. KCl feed to funnel No. 3 was then added, consisting of 16.8 grams KCl (225 milliequivalents), 143 grams $H_2O$ and 92 grams isopropyl alcohol. $(NH_4)_2HPO_4$ feed to funnel No. 1 was added consisting of 14.9 grams $(NH_4)_2HPO_4$ (225 milliequivalents), 57 grams $H_2O$ and 8 grams isopropyl alcohol. Contents of both funnels were brought to equilibrium by shaking. The lighter layer from funnel No. 1 was withdrawn as extract product, the heavier layer from funnel No. 3 withdrawn as raffinate product and the two remaining layers transferred to funnel No. 2 and brought to equilibrium. This constitutes the end of the first cycle.

Successive cycles were ran in the same way as the first cycle, until a reasonable steady state was reached as evidenced by a constancy of the layer sizes on successive cycles. This was achieved in this example on cycle No. 5. The extract and raffinate solutions from the fifth cycle were analyzed and the results are set forth and compared to the composition of the feed streams in the table below:

| | Composition of light organic solvent-rich phase | | Composition of heavy water-rich phase | |
|---|---|---|---|---|
| | Withdrawn at stage 1 | Introduced at stage 3 | Withdrawn at stage 3 | Introduced at stage 1 |
| Total quantity of ions (milliequivalents): | | | | |
| $NH_4^+$ | 112 | 0 | 87 | 225 |
| $K^+$ | 33 | 225 | 198 | 0 |
| $Cl^-$ | 95 | 225 | 128 | 0 |
| $HPO_4^=$ | 50 | 0 | 157 | 225 |
| Total quantity of— | | | | |
| $H_2O$ (grams) | 120 | 143 | 74 | 57 |
| Isopropyl alcohol (grams) | 94 | 92 | 11 | 8 |
| Equivalent ratios: | | | | |
| $NH_4^+/K^+$ | 77/23 | 0/100 | 30/70 | 100/0 |
| $Cl^-/HPO_4^=$ | 66/34 | 100/0 | 45/55 | 0/100 |

The result of this 3-stage reaction has also been set forth graphically in FIG. 5 where the result may be compared with the result of the 1-stage reaction of Example 1 and with Example 31 wherein a 5-stage reaction zone has been used together with stripping zones. The compositions of the extract and raffinate product streams are given by the equivalent ratios at the bottom of the table and shown graphically in FIG. 5. Since the main function of the reactor is to provide separation of the cations, it will be noted that this has been accomplished to a significant degree by the 3-stage operation over the situation in the one-stage equilibrium test of Example 1. From substantially equal distribution, the three stages have brought the $NH_4^+/K^+$ ratio in the extract to 77/23 and the $K^+/NH_4^+$ ratio in the raffinate to 70/30. It is evident, however, that if substantially complete separation is desired, additional stages would be required.

Example 25

$$2NH_4Cl + K_2HPO_4 \rightarrow 2KCl + (NH_4)_2HPO_4$$

This reaction was carried out in three stages in the manner described in Example 24 except that the reactants were ammonium chloride and dipotassium phosphate.

The aqueous feed introduced at state 1 contained 225 milliequivalents (19.6 grams) of $K_2HPO_4$
8 grams isopropyl alcohol
100 grams water.

The organic solvent feed introduced at stage 3 contains:

225 milliequivalents (12.1 grams) of $NH_4Cl$
92 grams of isopropyl alcohol
100 grams of water.

The product streams were analyzed after the sixth cycle and the results are set forth and compared to the composition of the feed streams in the table below. The results show that the reaction is going in the desired direction. Comparison with Example 24 indicates that this reaction can be carried out in either direction with about equal effectiveness.

|  | Composition of light organic solvent-rich phase | | Composition of heavy water-rich phase | |
|---|---|---|---|---|
|  | Withdrawn at stage 1 | Introduced at stage 3 | Withdrawn at stage 3 | Introduced at stage 1 |
| Total quantity of ions (milliequivalents): | | | | |
| $NH_4^+$ | 48 | 225 | 183 | 0 |
| $K^+$ | 139 | 0 | 75 | 225 |
| $Cl^-$ | 111 | 225 | 120 | 0 |
| $HPO_4^-$ | 76 | 0 | 138 | 225 |
| Total quantity of— | | | | |
| $H_2O$ (grams) | 148 | 100 | 48 | 100 |
| Isopropyl alcohol (grams) | 97 | 92 | 7 | 8 |
| Equivalent ratios: | | | | |
| $NH_4^+/K^+$ | 26/74 | 100/0 | 71/29 | 0/10 |
| $Cl^-/HPO_4^-$ | 59/41 | 100/0 | 47/53 | 0/10 |

Example 26

$$2HCOONH_4 + K_2HPO_4 \rightarrow 2HCOOK + (NH_4)_2HPO_4$$

This reaction was carried out in the manner described in Example 24 except that the reactants were ammonium formate and dipotassium phosphate.

The aqueous feed introduced at stage 1 contained:

19.6 grams (225 milliequivalents) of $K_2HPO_4$
80 grams water.

The organic solvent feed introduced at stage 3 contained:

14.3 grams (225 milliequivalents) of ammonium formate ($HCOONH_4$)
100 grams of water
100 grams isopropyl alcohol.

The product streams were analyzed after the 7th cycle and the results are set forth and compared to the feed streams in the table below. It can be seen from this data that the reaction of $K_2HPO_4$ with ammonium formate is comparably as effective as was the reaction with ammonium chloride in Example 25.

|  | Composition of light organic solvent-rich phase | | Composition of heavy water-rich phase | |
|---|---|---|---|---|
|  | Withdrawn at stage 1 | Introduced at stage 3 | Withdrawn at stage 3 | Introduced at stage 1 |
| Total quantity of ions (milliequivalents): | | | | |
| $NH_4^+$ | 61 | 225 | 136 | 0 |
| $K^+$ | 171 | 0 | 57 | 225 |
| $HCOO^-$ | 160 | 225 | 47 | 0 |
| $HPO_4^-$ | 72 | 0 | 146 | 225 |
| Total quantity of— | | | | |
| $H_2O$ (grams) | (¹) | 100 | (¹) | 80 |
| Isopropyl alcohol (grams) | (¹) | 100 | (¹) | 0 |
| Equivalent ratios: | | | | |
| $NH_4^+/K^+$ | 26/74 | 100/0 | 71/29 | 0/100 |
| $HCOO^-/HPO_4^-$ | 69/31 | 100/0 | 24/76 | 0/100 |

¹ Not analyzed.

Example 27

$$2NaNO_3 + (NH_4)_2SO_4 \rightarrow 2NH_4NO_3 + Na_2SO_4$$

This reaction was carried out in the manner described in Example 24 except that the reactants were sodium nitrate and ammonium sulfate and the organic solvent was acetone.

The aqueous feed introduced at stage 1 contained:

16.5 grams (250 milliequivalents) $(NH_4)_2SO_4$
50 grams water
10 grams acetone.

The solvent feed introduced at stage 3 contained:

21.2 grams (250 milliequivalents) $NaNO_3$
80 grams water
40 grams acetone.

The product streams were analyzed after the 7th cycle and the results are set forth and compared to the feed streams in the table below.

The results indicate that the 3-stage operation was effective in separating the $NH_4^+$ and $Na^+$ cations, although additional stages would be required to obtain substantially complete separation, and an increase in the ratio of water to acetone would be necessary to obtain more equal quantities of the two products. Also this example demonstrates the effectiveness of acetone as a solvent.

|  | Composition of light organic solvent-rich phase | | Composition of heavy water-rich phase | |
|---|---|---|---|---|
|  | Withdrawn at stage 1 | Introduced at stage 3 | Withdrawn at stage 3 | Introduced at stage 1 |
| Total quantity of ions (milliequivalents): | | | | |
| $NH_4^+$ | 224 | 0 | 13 | 250 |
| $Na^+$ | 202 | 250 | 76 | 0 |
| $NO_3^-$ | 248 | 250 | 29 | 0 |
| $SO_4^-$ | 178 | 0 | 60 | 250 |
| Total quantity of— | | | | |
| $H_2O$ (grams) | 122 | 80 | 13 | 50 |
| Acetone (grams) | (¹) | 40 | (¹) | 10 |
| Equivalent ratios: | | | | |
| $NH_4^+/Na^+$ | 53/47 | 0/100 | 15/85 | 100/0 |
| $NO_3^-/SO_4^-$ | 58/42 | 100/0 | 33/67 | 0/100 |

Example 28

$$K_3C_6H_5O_7 + 3NH_4Cl \rightarrow (NH_4)_3C_6H_5O_7 + 3KCl$$

This reaction was carried out in the manner described in Example 24 except the reactants were ammonium chloride and tripotassium citrate.

The aqueous feed introduced at stage 1 contained:

100 milliequivalents tripotassium citrate (prepared from 7.0 grams citric acid hydrate and 5.6 grams KOH).
25 grams water.

The solvent feed introduced at stage 3 contained:

100 milliequivalents ammonium chloride (5.35 grams)
50 grams water
75 grams isopropyl alcohol.

The product streams were analyzed after the 5th cycle and the results are set forth and compared to the feed streams in the table below. Good separation of $NH_4^+$ and $K^+$ cations was achieved but more stages would be required for substantially complete separation. This run also demonstrates the applicability of the process of this invention to a trivalent organic anion, the trivalent citrate.

|  | Composition of light organic solvent-rich phase | | Composition of heavy water-rich phase | |
| --- | --- | --- | --- | --- |
|  | Withdrawn at stage 1 | Introduced at stage 3 | Withdrawn at stage 3 | Introduced at stage 1 |
| Total quantity of ions (milliequivalents): | | | | |
| $NH_4^+$ | 13 | 100 | 87 | 0 |
| $K^+$ | 36 | 0 | 58 | 100 |
| $Cl^-$ | 31 | 100 | 68 | 0 |
| $C_6H_5O_7^\equiv$ | 18 | 0 | 77 | 100 |
| Total quantity of— | | | | |
| $H_2O$, grams | 50 | 50 | 30 | 25 |
| Isopropyl alcohol | 71 | 75 | 1 | 0 |
| Equivalent ratios: | | | | |
| $NH_4^+/K^+$ | 27/73 | 100/0 | 60/40 | 0/100 |
| $Cl^-/C_6H_5O_7^\equiv$ | 63/37 | 100/0 | 47/53 | 0/100 |

Example 29

$2KF + (NH_4)_2HPO_4 \rightarrow 2NH_4F + K_2HPO_4$

This reaction was carried out in the manner described in Example 24 except that the reactants were potassium fluoride and diammonium phosphate.

The aqueous feed introduced at stage 1 contained:

150 milliequivalents $(NH_4)_2HPO_4$ (9.9 grams)
25 grams water.

The solvent feed introduced at stage 3 contained:

150 milliequivalents KF (8.7 grams)
100 grams water
100 grams ethanol.

The product streams were analyzed after the third cycle and the results are set forth and compared to the feed streams in the table below.

The results indicated that the 3-stage operation was effective in separating the $NH_4^+$ and $K^+$ cations, although additional stages would be required to obtain substantially complete separation. Moreover, the example indicates that ethanol is an effective solvent. Furthermore, it appears that the system had not quite reached steady state at the end of the 3d cycle and one or more additional cycles would have been required to do so.

|  | Composition of light organic solvent-rich phase | | Composition of heavy water-rich phase | |
| --- | --- | --- | --- | --- |
|  | Withdrawn at stage 1 | Introduced at stage 3 | Withdrawn at stage 3 | Introduced at stage 1 |
| Total quantity of ions (milliequivalents): | | | | |
| $NH_4^+$ | 73 | 0 | 53 | 100 |
| $K^+$ | 36 | 100 | 168 | 0 |
| $F^-$ | 79 | 100 | 79 | 0 |
| $HPO_4^=$ | 30 | 0 | 142 | 100 |
| Total quantity of— | | | | |
| $H_2O$ (grams) | 108 | 100 | 29 | 25 |
| Ethanol (grams) | 125 | 100 | 2 | 0 |
| Equivalent ratios: | | | | |
| $NH_4^+/K^+$ | 67/33 | 0/100 | 24/76 | 100/0 |
| $F^-/HPO_4^=$ | 72/28 | 100/0 | 36/64 | 0/100 |

Example 30

$2KCl + (NH_4)_2HPO_4 \rightarrow K_2HPO_4 + 2NH_4Cl$

This reaction was carried out in the manner described in Example 24 except that a mixture of methanol and isopropanol was used as solvent.

The aqueous feed introduced at stage 1 contained:

14.9 grams $(NH_4)_2HPO_4$ (225 milliequivalents)
100 grams water
58 grams isopropyl alcohol.

The solvent feed introduced at stage 3 contained:

16.8 grams KCl (225 milliequivalents)
100 grams water
50 grams isopropyl alcohol
50 grams methanol.

The product streams were analyzed after the second cycle and the results are set forth and compared to the feed streams in the table below.

The results indicate that the 3-stage operation was effective in separating $NH_4^+$ and $K^+$ cations, although additional stages would be required to obtain substantially complete separation. The 2 cycles had not been enough to bring the system to a steady state. Nevertheless, the example demonstrates the suitability of a mixture of methanol and isopropyl alcohol as solvent.

|  | Composition of light organic solvent-rich phase | | Composition of heavy water-rich phase | |
| --- | --- | --- | --- | --- |
|  | Withdrawn at stage 1 | Introduced at stage 3 | Withdrawn at stage 3 | Introduced at stage 1 |
| Total quantity of ions (milliequivalents): | | | | |
| $NH_4^+$ | 177 | 0 | 37 | 225 |
| $K^+$ | 95 | 225 | 113 | 0 |
| $Cl^-$ | 184 | 225 | 36 | 0 |
| $HPO_4^=$ | 88 | 0 | 114 | 225 |
| Total quantity of— | | | | |
| Water (grams) | | 100 | | 100 |
| Methanol (grams) | | 50 | | 0 |
| Isopropyl alcohol (grams) | | 50 | | 58 |
| Equivalent ratios: | | | | |
| $NH_4^+/K^+$ | 65/35 | 0/100 | 25/75 | 100/0 |
| $Cl^-/H_2PO_4^-$ | 68/32 | 100/0 | 24/76 | 0/100 |

Example 31

$2KCl + (NH_4)_2HPO_4 \rightarrow K_2HPO_4 + 2NH_4Cl$

The conversion of potassium chloride and diammonium phosphate to potassium phosphate and ammonium chloride was effected in a set of seventeen separatory funnels. Five of the seventeen funnels constituted a 5-stage phosphate stripping section. The remaining 12 funnels formed a 19-stage reaction section and a 3-stage chloride stripping section. A single stage consists in thorough mixing of two or more liquids, followed by settling, and separation of the layers.

Startup of reaction section.—Operation was begun without stripping sections, using feed solutions that included not only diammonium phosphate and potassium chloride, but also estimated quantities of salts that would be returned to the reaction section by the strippers. These feeds were:

P feed—left end:
  4.4 grams $(NH_4)_2HPO_4$
  1.8 grams $NH_4Cl$
  17.0 grams $H_2O$ Q feed—right end:
  5.0 grams KCl
  2.9 grams $K_2HPO_4$
  63.0 grams $H_2O$
  40.0 grams isopropyl alcohol.

A row of 10 empty separatory funnels was set up, with the position (not the funnels themselves) lettered A to J from left to right. To start the operation, P feed and Q feed were mixed in the funnel in A position. After layer separation, the lower layer was moved to the funnel at B, leaving the top layer in funnel at A. Feed P was added at A, and feed Q at B, and funnels were shaken. After layer separation, the lower layers at A and B were moved to B and C, respectively. Feed P was added at A, and feed Q at C, and the process was continued. A point was finally reached where feed P was added at A, and feed Q at J. After mixing and layer separation, the bottom layer at J was taken as a sample, and so was the top layer remaining at A. Because the funnel at A was now empty,

19 it was rinsed out, drained, and then placed at position J after each of the other funnels had been moved one place to the left. The operation was continued with additions of feed P at A, and feed Q at J, and concurrent removal of top layers at A and bottom layers at J.

Startup of chloride stripping section.—Two funnels were added to the 10 in the reaction section, and two new places, K and L, were designated to the right of J. These were added on, by manipulations similar to those used in startup of the reaction section. Charges were as follows: Feed Q was replaced by feed $Q^1$ containing:

2.5 grams KCl
8.8 grams $H_2O$.

The other salts, formerly in feed Q, are in the return flow from K to J.

Feed S, which was supplied at L comprises:

35.8 grams isopropyl alcohol
40.3 grams $H_2O$.

The lower layer from J was moved to the funnel at K, and the lower layer from K was taken as product.

Startup of the phosphate stripping section.—The five funnels in the phosphate stripping section were kept in fixed positions, marked V–Z, to the left of the reaction section. These were used as two sets, V–X–Z and W–Y. Once the startup had been completed, operations were carried out as follows:

Bottom layers from funnels W and Y were transferred to funnels X and Z, respectively. (Only 35 to 37 grams of lower layer from W was transferred; the remainder was left in the funnel.) Top layers from funnels W and Y were transferred to funnels V and X. A simulated reflux was added to funnel V. This comprised:

1.8 grams $NH_4Cl$
7.2 grams $H_2O$
15.5 grams isopropyl alcohol.

To funnel Z was added the upper layer taken from the reaction section at A, together with 104 grams of isopropyl alcohol. Hexane was added to each of the three funnels to cause separation into two layers.

Funnels V–X–Z were shaken and layers allowed to separate. The upper layer from V was taken as ammonium chloride solution, and the bottom layer from Z was transferred to the reaction section at A. Bottom layers from funnels V and X were transferred to W and Y, respectively, and top layers from funnels X and Z were transferred to W and Y. Hexane was added to funnel Y to give approximately 27 to 28 milliliters of lower layer after shaking.

The amounts of hexane added to the funnels in each cycle were adjusted to give lower layers of the desired weights, and especially to obtain a lower layer at Z, weighing 22 to 24 grams. Typical but not limiting amounts of hexane are 9 grams at V, none at W, 3 grams at X, 7 grams at Y, and 23 grams at Z.

Integrated operation of the entire countercurrent extraction.—Operation of the phosphate section (V–Z) was coordinated with that of the reaction section and chloride stripper, (A–L) which worked as a unit. Feed P to the funnel at A was changed to feed $P^1$ comprising 2.2 grams diammonium phosphate
3.3 grams $H_2O$ The other salts that had been in feed P were provided in the return stream from funnel Z.

A complete cycle for the reaction section and chloride stripper comprised the folowing steps.

(a) Add feed S (water and isopropyl alcohol) to funnel at L.
(b) Move the upper layer from the funnel at A into the Z funnel of the phosphate stripper.
(c) Remove empty funnel from A and drain it.

20

(d) Shake each funnel at positions B to L and move one space to the left (positions A to K).
(e) Move each bottom layer one space to the right. Bottom layer at K is taken as product.
(f) To funnel at A, add feed $P^1$ (diammonium phosphate solution) and the return stream from funnel Z.
(g) To funnel at J, add feed $Q^1$ (potassium chloride solution).
(h) Place empty funnel (step (c)) at L.
(i) Shake funnels at A to K.
(j) Move bottom layers one space to right.

Twice in the cycle, all eleven filled funnels are shaken, giving 22 mixing stages. At (d), nine are ascribed to the reaction section and two to chloride stripping. At (i), ten are ascribed to the reaction section and one to chloride stripping. For each of these cycles, a complete cycle is run in the phosphate stripping section.

Results.—After 25 cycles had been run, the V-upper and K-lower layers were analyzed with results shown below. Errors in the material balance are considered to be due partly to losses in repeated handling of the layers. Such losses would not be expected with use of commercial extraction equipment.

| | V-upper ($NH_4Cl$ solution) | K-lower ($K_2HPO_4$ solution) |
|---|---|---|
| Layer weight, grams | 251.8 | 6.9 |
| Ion concentrations, milliequivalents per 100 grams: | | |
| $NH_4^+$ | 28.8 | 17.8 |
| $K^+$ | 2.06 | 289.3 |
| $Cl^-$ | 29.5 | 0.0 |
| $HPO_4^-$ | 0.085 | 307.1 |
| Ions, milliequivalents in layers: | | |
| $NH_4^+$ | 72.5 | 1.2 |
| $K^+$ | 5.2 | 20.0 |
| $Cl^-$ | 74.3 | 0.0 |
| $HPO_4^-$ | 0.2 | 21.2 |
| Distribution, percentage of total in layers: | | |
| $NH_4^+$ | 98 | 2 |
| $K^+$ | 21 | 79 |
| $Cl^-$ | 100 | 0 |
| $HPO_4^-$ | 1 | 99 |
| Equivalent ratios: | | |
| $NH_4^+/K^+$ | 93/7 | 6/94 |
| $Cl^-/HPO_4^-$ | 99.7/0.3 | 0/100 |

The compositions of the extract and raffinate product streams are shown graphically in FIG. 5 in comparison with 1 stage and 3 stage process of Examples 1 and 24 respectively.

Example 32

Potassium chloride was caused to react with an aqueous solution of an ammonia neutralized superphosphoric acid. The preparation of polyphosphates is described in numerous patents including U.S. Pats. 3,015,552; 2,999,010 and British Pat. 1,036,544. The ammonia neutralized superphosphoric acid (hereinafter called ammonium superphosphate) employed herein was a fertilizer of 10–34–0 grade, containing 10 percent nitrogen and 34 percent $P_2O_5$. Approximately 51 percent of the $P_2O_5$ was in forms other than orthophosphate, predominantly pyrophosphate, but including some tripolyphosphate and a small amount of tetrapolyphosphate. Thus, the various ammonium salts listed above were present and were reacted with KCl. The desired product was a phosphate solution in which most of the ammonium ions were replaced by potassium ions. The by-product was a solution of ammonium chloride.

Startup of reaction section.—A set of 13 separatory funnels were used, 5 (called V–Z) in the phosphate stripping section, 5 (A–E) in the reaction section, and 3

(F–H) in the chloride stripping section. These were divided into two groups, V–X–Z–B–D–F–H and W–Y–A–C–E–G, which were filled alternately.

The reaction section was started by adding to the middle funnel, C, 100 milliequivalents each of KCl and ammonium superphosphate together with 71.5 grams water and 37.0 grams isopropyl alcohol so that the chloride and phosphate were properly distributed between the upper and lower layers. The upper layer was moved to funnel B, where it was mixed with a mixture of 25 meq. $NNH_4Cl$, 75 meq. ammonium superphosphate, 16 g. water and isopropyl alcohol. The lower layer was mixed in funnel D with 75 meq. KCl, 25 meq. ammonium superphosphate, 64.3 g. water and 36 g. isopropyl alcohol. The upper layer from D and the lower from B were mixed in C. The upper layer from B and the lower layer from D were used to start funnels A and E in the same way. Composition of the layers during startup is not critical because system is later operated to reach steady state.

Startup of chloride stripping section.—The chloride stripping section was built up from a temporary funnel E containing a solution containing 100 milliequivalents of KCl and 100 milliequivalents of ammonium superphosphate in 68 g. water and 1 g. isopropyl alcohol. This solution simulated the lower layer from funnel D.) By adding a solution of 25 milliequivalents of ammonium superphosphate in 43.5 g. of water and 36.2 g. isopropyl alcohol, a new lower layer was obtained and placed in funnel F. This was treated with another portion of the same ammonium superphosphate solution, giving a lower layer to be placed in the G funnel. The series was extended to the H funnel in the same way.

Startup of phosphate stripping section.—The phosphate stripping section was started by adding a solution of 100 milliequivalents of $NH_4Cl$ in water and isopropyl alcohol in V and in X, while Z received a solution of 33 milliequivalents of ammonium superphosphate, 75 milliequivalents of $NH_4Cl$, and 25 milliequivalents of KCl. The size of lower layer in each funnel was adjusted to 20–30 g. by adding small amounts of hexane.

The reaction and chloride stripping sections were started separately and then integrated. At this time, operation of the phosphate stripping section was begun as described above and immediately integrated with operation of the reaction section.

Integrated operation of the entire countercurrent extraction.—Once the operation has been set up, and funnels of set W–G have been filled and shaken, it proceeds as follows: the bottom layers are moved one place to the right in the alternate set, i.e., W to X, Y to Z, and so on to G to H. The upper layers are moved one place to the left, i.e., W to V, Y to X, and so on to G to F. Thus, two layers are moved into each funnel, X–Z–B–D–F, and one into each funnel V and H. Funnel V also receives feed R, a simulated ammonium chloride reflux:

1.34 grams $NH_4Cl$ (25 milliequivalents)
12.9 grams $H_2O$
15.6 grams isopropyl alcohol.

Hexane (about 4–10 g.) is also added as needed to funnels V, W, and X to give bottom layers of 29–30 g. About 14 g. hexane is added to funnels Y and Z to give bottom layers of 21 and 17 g., respectively. Funnel H receives feed S:

43.5 grams $H_2O$
36.3 grams isopropyl alcohol.

Feed T, 105 grams of isopropyl alcohol, is added to funnel Z.

After shaking and layer separation, the lower layers are each moved one place to the right; the upper layers, one place to the left. The lower layer from H is taken as potassium phosphate solution, the upper layer from V as ammonium chloride solution. Each funnel of the set W–G receives two layers. In addition, funnel A receives feed P and funnel E receives feed Q.

Feed P:
    7.0 grams 10–34–0 solution containing 50 milliequivalents of ammonium superphosphate.
Feed Q:
    3.7 grams KCl (50 milliequivalents)
    18.7 grams $H_2O$.

Quantities of salts fed at each cycle were:

50 milliequivalents (3.7 grams) KCl
    50 milliequivalents ammonium superphosphate in 7.0 grams 10–34–0 solution
    25 milliequivalents (1.34 grams $NH_4Cl$).

After 6 cycles of integrated operation, the V-upper and H-lower layers were analyzed with results shown below.

|  | V-upper ($NH_4Cl$ solution) | H-lower (K phosphate solution) |
|---|---|---|
| Layer weight, grams | 263.0 | 12.1 |
| Ion concentrations, milliequivalents per 100 grams: | | |
| $NH_4^+$ | 23.6 | 91.0 |
| $K^+$ | 4.0 | 292.0 |
| $Cl^-$ | 30.4 | 2.0 |
| Phosphates | 0.0 | 381.0 |
| Ions, milliequivalents in layers: | | |
| $NH_4^+$ | 62.1 | 11.0 |
| $K^+$ | 10.5 | 35.3 |
| $Cl^-$ | 80.0 | 0.2 |
| Phosphates | 0.0 | 46.1 |
| Distribution, percentage of total in layers: | | |
| $NH_4^+$ | 85 | 15 |
| $K^+$ | 23 | 77 |
| $Cl^-$ | 99.8 | 0.2 |
| Phosphates | 0 | 100 |
| Equivalent ratios: | | |
| $NH_4^+/K^+$ | 86/14 | 24/76 |
| $Cl^-$/phosphates | 100/0 | 0.5/99.5 |

Example 33

$$2KCl + (NH_4)_2CO_3 \rightarrow K_2CO_3 + NH_4Cl$$

This example was started up and operated in the manner described in Example 24, using the reactants KCl and $(NH_4)_2CO_3$, but modified to 5 reaction stages numbered 1 to 5, and no actual stripping sections.

The aqueous feed which was introduced at stage 1 contained:

72 milliequivalents (3.8 grams) of $NH_4Cl$
108 milliequivalents (4.2 grams) of $(NH_4)_2CO_3$
77 milliequivalents (1.3 grams) of free $NH_3$
10.3 grams of water.

The organic solvent feed which was introduced at stage 5 contained:

90 milliequivalents (6.7 grams) of KCl
60 milliequivalents (4.1 grams) of $K_2CO_3$
447 milliequivalents (7.6 grams) of free $NH_3$
63 grams water.

This reaction was carried out to demonstrate applicability of the process of this invention as a means for manufacture of $K_2CO_3$. While the example is limited to a reaction section, the feeds thereto included not only the reactant $(NH_4)_2CO_3$ and KCl but the quantities of $NH_4Cl$ and $K_2CO_3$ which would be returned to the reactor when operated in conjunction with chloride and carbonate stripping sections. Free ammonia was added to maintain the $(NH_4)_2CO_3$ present in this form and prevent its conversion to $NH_4HCO_3$.

The content of the resulting product streams is set forth in the table below. Comparison of the content of the feed streams with the product streams indicates that the reaction is proceeding in the desired direction.

| | Composition of light, organic solvent rich phase | | Composition of heavy water rich phase | |
|---|---|---|---|---|
| | Withdrawn at stage 1 | Introduced at stage 5 | Withdrawn at stage 5 | Introduced at stage 1 |
| Total quantity of ions (milliequivalents): | | | | |
| $NH_4^+$ | 161 | 0 | 20 | 180 |
| $K^+$ | 16 | 150 | 136 | 0 |
| $Cl^-$ | 97 | 90 | 69 | 72 |
| $CO_3^=$ | 81 | 60 | 86 | 108 |
| Total quantity of water (g.): | | | | |
| Water (g.) | 47 | 63 | 26 | 10.3 |
| Isopropyl alcohol (g.) | 92 | 95 | 3 | 0 |
| $NH_3$ (milliequivalents) | 362 | 447 | 90 | 77 |
| Distribution, percent of total of each ion (in milliequivalents) in each phase: | | | | |
| $NH_4^+$ | 89 | 0 | 11 | 100 |
| $K^+$ | 10.5 | 100 | 89.5 | 0 |
| $Cl^-$ | 58.5 | 46 | 41.5 | 44 |
| $CO_3^=$ | 48.5 | 36 | 51.5 | 64 |
| Equivalent ratios: | | | | |
| $NH_4^+/K^+$ | 91/9 | 0/100 | 13/87 | 100/0 |
| $Cl^-/CO_3^=$ | 55/45 | 60/40 | 44/56 | 40/6 |

The compositions of the extract and raffinate products streams are shown graphically in FIG. 6, in comparison with the 1 stage reaction of Example 16.

The results show quite good separation of the $NH_4^+$ and $K^+$ ions in the 5 stages, i.e., 91% of the cations in the extract, (organic-rich layer) was $NH_4^+$ and 87% of the cations in the raffinate (water-rich layer) were $K^+$. Nevertheless, it may be desirable to achieve even greater separation, e.g., in excess of 95% for each of these quantities, in which case it is indicated that some 5 or more additional stages would be needed. There has been only limited separation of the $Cl^-$ and $CO_3^=$ ions (55% $Cl^-$ in extract and 56% $CO_3^=$ in raffinate), but this separation is not primarily effected in the reactor, but in the attached $CO_3^=$ and $Cl^-$ stripping reactions where substantially complete separation can be obtained in 3 to 5 stages in each.

EXAMPLE 34

This example demonstrates that the process can be operated advantageously at temperatures above ambient temperatures.

$$2KCl + Na_2HPO_4 \rightarrow K_2HPO_4 + 2NaCl$$

Disodium phosphate was reacted with KCl in accordance with the above equation. This reaction was carried out as described below with the reaction temperature maintained at about 50° C. throughout the operation. As a further modification of the process, solid NaCl was used to supply reflux and form the desired amount of aqueous phase in the system. Thus, in steady state operation, all or substantially all of the solvent and water may be added at one end of the extraction system.

Startup procedure.—A set of 9 separatory funnels were used. These were divided into two groups, A–C–E–G–I and B–D–F–H, which were filled alternately.

The extraction system was started by adding to funnels A–C–E–G–I the quantities of materials indicated below.

| Material | Amount in funnel | | | | |
|---|---|---|---|---|---|
| | A | C | E | G | I |
| Isopropyl alcohol, grams | 100 | 100 | 100 | 100 | 100 |
| Water, grams | 100 | 100 | 100 | 100 | 100 |
| NaCl, milliequivalents | 250 | 50 | | | |
| $Na_2HPO_4$, milliequivalents | | 50 | 50 | | |
| KCl, milliequivalents | | | 50 | 50 | |
| $K_2HPO_4$, milliequivalents | | | | 50 | 50 |

Two liquid layers formed in each of these funnels. Next, funnels B–D–F–H were filled from the first group of funnels. That is, the lower layer from A and the upper layer from C were used to start B, and in a similar manner funnels D, F and H were filled from corresponding funnels of the first group. Additional NaCl, 100 milliequivalents, was added to funnel B to maintain an adequate lower layer during startup.

Integrated operation of the entire countercurrent extraction.—Once the initial operation had been set up and funnels B–H had been filled and shaken, the operation was as follows: The bottom layers were moved one place to the right in the alternate set of funnels, i.e., B to C, and so on to H to I. The upper layers were moved one place to the left. Thus, two layers were moved into each funnel, C–E–G and one into each funnel A and I. Funnels A and B each also received about 42 milliequivalents NaCl to adjust the bottom layers to the proper size (about 35 grams). Also funnel I received feed consisting of 100 grams isopropyl alcohol and 100 grams water. In addition, funnel C received 50 milliequivalents $Na_2HPO_4$ and the funnel G received 50 milliequivalents KCl. After shaking the funnels, layers were allowed to form, thus completing the cycle. Operation was continued for 10 cycles.

Quantities of materials fed at each cycle were substantially as follows:

| | |
|---|---|
| $K^+$, milliequivalents | 50 |
| $Na^+$, milliequivalents | 134 |
| $Cl^-$, milliequivalents | 134 |
| $(HPO_4)^=$, milliequivalents | 50 |
| Isopropyl alcohol, grams | 100 |
| Water, grams | 100 |

After 10 cycles of integrated operation, the A-upper and I-lower layers were analyzed with results shown below.

| | A-upper (NaCl solution) | I-lower ($K_2HPO_4$ solution) |
|---|---|---|
| Layer, weight, grams | 196.5 | 17.7 |
| Amount per 100 grams: | | |
| $K^+$, milliequivalents | 10.5 | 162.3 |
| $Na^+$, milliequivalents | 61.3 | 72.0 |
| $Cl^-$, milliequivalents | 69.6 | 2.3 |
| $(HPO_4)^=$, milliequivalents | 7.2 | 232.0 |
| Isopropyl alcohol, grams | 50.4 | 5.8 |
| Water, grams | 44.1 | 75.0 |
| Ions, milliequivalents in layers: | | |
| $K^+$ | 20.6 | 28.7 |
| $Na^+$ | 120.5 | 12.7 |
| $Cl^-$ | 137.0 | 0.4 |
| $(HPO_4)^=$ | 4.3 | 41.0 |

The lower layer from I contained most of the potassium and phosphate fed to the system and would be useful for preparing a fertilizer.

SEPARATION OF SALT MIXTURES

Example 35

This example illustrates the separation of a mixture of diammonium and dipotassium phosphates from a mixture of the corresponding chlorides and does not involve a reactor section with split or remote salt feeds.

Extraction test.—An extraction test was made in which portions of an aqueous salt solution containing $NH_4^+$, $K^+$, $Cl^-$ and $HPO_4^=$ ions were treated countercurrently with portions of a solvent consisting of isopropyl alcohol and water. The extraction system consisted of eight separatory funnels used as mixer-settler units. The salt solution was fed to No. 5 funnel, the solvent mixture was fed to No. 8 funnel and the raffinate (aqueous solution) was drawn from No. 8 funnel. The extract from No. 1 funnel was the product extract. The extraction system was started up by adding the salt solution consisting of 112.5 milliequivalents of KCl, 112.5 milliequivalents of $$(NH_4)_2HPO_4$$

and 62.3 grams water, and solvent consisting of 51.1 grams of isopropyl alcohol and 25.6 grams of water to No. 5 funnel, mixing, then separating the phases, moving the lower aqueous layer to No. 6 funnel and the upper layer to No. 4 funnel. In the succeeding steps the same amount of salt solution was fed to No. 5 funnel and the same amount of solvent was added to No. 6 funnel, then No. 7, then No. 8 funnel. After the third feed cycle, extract from No. 2 funnel was treated in a so-called knockdown step to supply reflux by adding a mixture of 12.5 grams isopropyl alcohol and 1.75 grams toluene, mixing and separating the resulting aqueous phase which was returned to No. 2 funnel as reflux in the next and succeeding cycles. The test was continued to approach steady-state operation. After the addition of twelve portions of feed, the product streams were analyzed. The operating conditions and results are summarized below.

|  | Feed | Solvent | Knock-down | Reflux | Extract | Raffinate |
|---|---|---|---|---|---|---|
| Volume, ml | 70 | 88 | 18.2 | 38 | 154 | 13.0 |
| Weight, grams | 78.4 | 76.7 | 14.2 |  | 141 | 16.5 |
| Water, wt. percent | 79.7 | 33.3 |  |  | 49.5 | 53.4 |
| Isopropyl alcohol, wt. percent |  | 66.7 | 87.7 |  | 43.1 | 0.9 |
| Toluene, wt. percent |  |  | 12.3 |  | 1.3 |  |
| Chloride, wt. percent |  |  |  |  | 2.39 | 0.75 |
| Chloride, meq | 112.5 |  |  |  | 95.0 | 3.5 |
| P₂O₅, wt. percent |  |  |  |  | 0.53 | 17.6 |
| P₂O₅, meq | 112.5 |  |  |  | 21.5 | 81.6 |
| K, wt. percent |  |  |  |  | 1.53 | 9.94 |
| K, meq | 112.5 |  |  |  | 55.2 | 41.9 |
| NH₄, wt. percent |  |  |  |  |  |  |
| NH₄, meq | 112.5 |  |  |  | 61.3 | 43.2 |

The equivalent ratios in the extract and raffinate products are as follows:

|  | Extract | Raffinate |
|---|---|---|
| NH₄⁺/K⁺ | 53/47 | 51/49 |
| Cl⁻/HPO₄⁼ | 82/18 | 4/96 |

The mixed salt product low in chloride ion is especially useful as a fertilizer for crops such as tobacco where large amounts of chloride ion is a detriment. The mixed salt product high in chloride ion is useful as a fertilizer for crops such as rice where chloride ion is not a detriment or may be actually beneficial.

Example 36

This example illustrates the separation of a mixture of diammonium and dipotassium phosphates from a mixture of the corresponding chlorides and does not involve a reactor section with split or remote salt feeds.

Extraction test.—An extraction test was made in which portions of an aqueous salt solution containing $NH_4^+$, $K^+$, $Cl^-$ and $HPO_4^=$ ions were treated countercurrently with portions of solvent consisting of isopropyl alcohol and water. The extraction system consisted of three separatory funnels used as mixer-settler units. The salt solution was fed to No. 2 funnel, the solvent mixture was fed to No. 3 funnel and the raffinate (aqueous solution) was drawn from No. 3 funnel. The extract from No. 1 funnel was the product extract. The extraction system was started up by adding the salt solution consisting of 225 milliequivalents of KCl, 225 milliequivalents of $(NH_4)_2HPO_4$ and 125 grams water, and solvent consisting of 100 grams of isopropyl alcohol and 50 grams of water to No. 2 funnel, mixing, then separating the phases, moving the lower aqueous layer to No. 3 funnel and the upper layer to No. 1 funnel. In the succeeding steps the same amount of salt solution was fed to No. 2 funnel and the same amount of isopropyl alcohol-water solvent was added to No. 3 funnel. No. 1 funnel was treated in a so-called knockdown step to supply reflux by adding a mixture of 25 grams isopropyl alcohol and 3.5 grams toluene, mixing and separating the resulting aqueous phase which was returned to No. 2 funnel as reflux in the next and succeeding cycles. The test was continued to approach steady-state operation. After the addition of several portions of feed, the product streams were analyzed. The results are summarized below:

|  | Extract | Raffinate |
|---|---|---|
| Weight, grams | 265.8 | 56.1 |
| Water, wt. percent | 50.8 | 69.5 |
| Isopropyl alcohol, wt. percent | 47.4 | 3.6 |
| Toluene, wt. percent | 1.3 |  |
| Chloride, meq | 93 | 40 |
| Phosphate, meq | 43 | 197 |
| K, meq | 104 | 122 |
| NH₄, meq | 93 | 115 |

The equivalent ratios in the extract and raffinate products are as follows:

|  | Extract | Raffinate |
|---|---|---|
| NH₄⁺/K⁺ | 47/53 | 48/52 |
| Cl⁻/HPO₄⁼ | 68/32 | 17/83 |

This is a two-stage extraction unit with added reflux generator based on addition of isopropyl alcohol and toluene. Since there are 2 stages including the feed stage for the chloride removal and only one stage for the phosphate removal, better separation was obtained in the raffinate. By addition of more stages above or below the food stage, composition of extract or raffinate will approach upper and lower edges of the reciprocal salt pair diagram for the system. However, products of this example are considered useful fertilizers as prepared.

I claim:

1. A method for separating a mixture of water-soluble salts into salt containing polyvalent anion and salt containing monovalent anion wherein said salt mixture contains $Cl^-$ anions and $HPO_4^=$ anions; and wherein the cations of said salt mixture are $NH_4^+$ and $K^+$ which comprises:
   (a) introducing an aqueous solution of said salt mixture into an intermediate stage of an extraction zone containing a plurality of stages,
   (b) introducing a solvent consisting essentially of water and a water miscible organic liquid selected from the group consisting of methanol, ethanol, isopropyl alcohol, n-propyl alcohol, t-butyl alcohol, acetone, dioxane, B-ethoxyethanol, dimethyl sulfoxide, piperidine, t-butylamine, dimethylformamide at a point remote from the introduction of the mixture of salts,
   (c) passing said solvent countercurrent to and in intimate contact with said mixture of salts, a sufficient quantity of salts being maintained to cause separation of said solvent into two liquid phases, a phase rich in water and a phase rich in said organic liquid, whereby $HPO_4^=$ is selectively extracted into the water-rich phase and $Cl^-$ is selectively extracted into the organic liquid-rich phase,
   (d) withdrawing said water-rich phase containing $HPO_4^=$ from said extraction zone,
   (e) withdrawing said organic liquid-rich phase containing $Cl^-$ from said extraction zone.

2. A method as defined in claim 1 wherein after step (e), the additional steps of (f) passing said organic liquid-rich phase into a polyvalent anion stripping zone,
(g) passing water into said polyvalent anion stripping zone countercurrent to and in intimate contact with said organic liquid-rich phase,
(h) passing said water-rich phase into a monovalent anion stripping zone,
(i) passing said organic liquid into said monovalent anion stripping zone countercurrent to and in intimate contact with said water-rich phase,
(j) returning water containing stripped polyvalent anion from said polyvalent anion stripping zone to the extraction zone,
(k) withdrawing stripped organic liquid-rich phase containing monovalent anion from said polyvalent anion stripping zone,
(l) returning organic liquid containing stripped monovalent anion from said monovalent anion stripping zone to the extraction zone.
(m) withdrawing stripped water-rich phase containing polyvalent anion from said monovalent anion stripping zone.

3. A method as defined in claim 2 wherein about 0.1 to 20 parts by weight of liquid hydrocarbon per hundred parts of the mixture of water and organic solvent is introduced into the polyvalent anion stripping zone in order to ensure the separation of the mixture into two phases.

References Cited

UNITED STATES PATENTS

| | | | |
|---|---|---|---|
| 1,648,224 | 11/1927 | Hall | 23—312 R |
| 3,450,508 | 6/1969 | Cooper | 23—312 AH |
| 3,331,661 | 7/1967 | Boiston | 23—300 |
| 2,885,265 | 5/1959 | Cunningham | 23—312 P |
| 1,955,016 | 4/1934 | Prins et al. | 23—312 R |
| 3,511,606 | 5/1970 | Halff | 23—312 R |
| 2,443,168 | 6/1948 | Robson | 23—312 AH |
| 3,326,667 | 6/1967 | Rooy | 23—312 R |
| 2,002,797 | 5/1935 | Reich | 23—300 |
| 2,726,138 | 12/1955 | Cunningham | 23—312 AH |

FOREIGN PATENTS

| | | | |
|---|---|---|---|
| 626,641 | 1949 | Great Britain | 23—300 |
| 598,911 | 1959 | Italy | 23—312 R |

OTHER REFERENCES

Zharovskii et al.: Russian Journal of Inorg. Chem., vol. 6, No. 6, June 1961.

Garwin: Industrial & Engineering Chemistry, vol. 49, No. 9, September 1957, pp. 1355–1360.

Seidell: Soc. of Inorg. and Org. Eds., vol. 1, 1919, pp. 49 and 561.

Gilliot: Bull. Soc. Chim. Fr., 1951, pp. 992–1002.

NORMAN YUDKOFF, Primary Examiner

S. J. EMERY, Assistant Examiner

U.S. Cl. X.R.

23—312 A, 312 AH; 423—181, 321, 471, 308, 499